(12) United States Patent
Lewis et al.

(10) Patent No.: US 10,820,655 B2
(45) Date of Patent: Nov. 3, 2020

(54) ADD-ON IMPACT ENERGY ABSORBING PAD STRUCTURE FOR OUTSIDE OF MILITARY AND SPORT HELMETS

(71) Applicant: University of Massachusetts, Boston, MA (US)

(72) Inventors: Armand F. Lewis, Mattapoisett, MA (US); Yong K. Kim, North Dartmouth, MA (US)

(73) Assignee: University of Massachusetts, Boston, MA (US)

(*) Notice: Subject to any disclaimer, the term of this patent is extended or adjusted under 35 U.S.C. 154(b) by 268 days.

(21) Appl. No.: 15/706,962

(22) Filed: Sep. 18, 2017

(65) Prior Publication Data

US 2018/0092420 A1  Apr. 5, 2018

Related U.S. Application Data

(63) Continuation-in-part of application No. 15/100,674, filed as application No. PCT/US2014/067883 on Dec. 1, 2014, now Pat. No. 9,788,589.
(Continued)

(51) Int. Cl.
*A42B 3/06* (2006.01)
*F41H 5/04* (2006.01)
(Continued)

(52) U.S. Cl.
CPC .............. *A42B 3/061* (2013.01); *A42B 3/063* (2013.01); *A42B 3/069* (2013.01); *B32B 5/245* (2013.01); *F41H 1/04* (2013.01); *F41H 5/0471* (2013.01); *F41H 5/0478* (2013.01); *A63B 71/10* (2013.01); *A63B 2209/00* (2013.01); *B32B 2307/554* (2013.01); *B32B 2307/56* (2013.01); *B32B 2437/04* (2013.01); *D06N 7/0097* (2013.01);
(Continued)

(58) Field of Classification Search
CPC ......... A42B 3/061; A42B 3/063; A42B 3/069; B32B 5/245; B32B 2307/56; B32B 2307/04; B32B 2307/554; D06N 7/0097; D06N 2209/103; F41H 5/0478; F41H 1/08; F41H 1/04; F41H 5/0471
See application file for complete search history.

(56) References Cited

U.S. PATENT DOCUMENTS 2,019,186 A  10/1935  Kaiser
2,187,140 A   1/1940  Faris et al.
(Continued)

FOREIGN PATENT DOCUMENTS

| KR | 10-2008-000340 A | 1/2008 |
| WO | 2004012933 A1 | 2/2004 |
| WO | 2012087406 A2 | 6/2012 |

OTHER PUBLICATIONS

Brady, S., et al., "Wearable Sensors? What is There to Sense?", Studies in Health and Informatics, 117:80-88 (2005).
(Continued)

*Primary Examiner* — Cheryl Juska
(74) *Attorney, Agent, or Firm* — Armis IP Law, LLC

(57) ABSTRACT

A flocked helmet cover pad (FHCP) attachable add-on to a helmet cover includes a central hub and multiple appendages attached to the central hub. The appendages are shaped and arranged to provide additional impact energy absorption properties for a helmet.

13 Claims, 14 Drawing Sheets

Related U.S. Application Data

(60) Provisional application No. 61/932,930, filed on Jan. 29, 2014, provisional application No. 61/924,426, filed on Jan. 7, 2014, provisional application No. 61/911,180, filed on Dec. 3, 2013.

(51) Int. Cl.

| | | |
|---|---|---|
| A63B 71/10 | (2006.01) | |
| B32B 5/24 | (2006.01) | |
| D06N 7/00 | (2006.01) | |
| F41H 1/04 | (2006.01) | |
| F41H 1/08 | (2006.01) | |

(52) U.S. Cl.
CPC . *D06N 2203/068* (2013.01); *D06N 2209/103* (2013.01); *F41H 1/08* (2013.01)

(56) References Cited

U.S. PATENT DOCUMENTS

| | | |
|---|---|---|
| 2,303,203 A | 11/1942 | Faris et al. |
| 2,317,595 A | 4/1943 | Faris |
| 2,425,235 A | 8/1947 | Ferrante |
| 2,425,236 A | 8/1947 | Ferrante |
| 2,478,097 A | 8/1949 | Glanzer |
| 2,945,557 A | 7/1960 | Powers |
| 2,999,763 A | 9/1961 | Sommer |
| 3,018,845 A | 1/1962 | Powers |
| 3,215,584 A | 11/1965 | McConnell et al. |
| 3,496,054 A | 6/1970 | Baigas, Jr. |
| 3,583,890 A | 6/1971 | Klockman |
| 3,772,132 A | 11/1973 | Dulin, Jr. |
| 3,815,341 A | 6/1974 | Hamano |
| 3,828,934 A | 8/1974 | Green et al. |
| 3,860,469 A | 1/1975 | Gregorian et al. |
| 3,961,115 A | 6/1976 | Klein |
| 3,961,116 A | 6/1976 | Klein |
| 4,016,317 A | 4/1977 | Kalwaites |
| 4,078,106 A | 3/1978 | Lind |
| 4,092,246 A | 5/1978 | Kummer |
| 4,246,308 A | 1/1981 | Walsh |
| 4,297,404 A | 10/1981 | Nguyen |
| 4,461,791 A | 6/1984 | Matsui et al. |
| 4,515,845 A | 5/1985 | Annis |
| 4,622,253 A | 11/1986 | Levy et al. |
| 4,636,417 A | 1/1987 | Rasmussen |
| 4,699,818 A | 10/1987 | Evans et al. |
| 4,758,453 A | 7/1988 | Challet et al. |
| 4,847,133 A | 7/1989 | Foxman |
| 4,847,920 A * | 7/1989 | Aileo ................... A42B 3/226 2/424 |
| 4,908,128 A | 3/1990 | Chiba |
| 5,047,103 A | 9/1991 | Abrams et al. |
| 5,219,469 A | 6/1993 | Binzer et al. |
| 5,389,247 A | 2/1995 | Woodside |
| 5,543,194 A | 8/1996 | Rudy |
| 5,985,148 A | 11/1999 | Liu |
| 6,060,145 A | 5/2000 | Smith et al. |
| 6,103,641 A | 8/2000 | Ghering, Jr. |
| 6,159,372 A | 12/2000 | Yang |
| 6,365,258 B1 | 4/2002 | Alm |
| 6,602,407 B2 | 8/2003 | Talbot et al. |
| 6,692,811 B1 | 2/2004 | Lasko |
| 8,533,869 B1 | 9/2013 | Capuano |
| 8,850,692 B2 | 10/2014 | Han |
| 9,204,678 B1 * | 12/2015 | Brachos ................ A42B 3/147 |
| 9,321,218 B2 | 4/2016 | Han |
| 9,446,413 B2 | 9/2016 | Blanchard |
| 2001/0008039 A1 | 7/2001 | Alboom et al. |
| 2002/0023871 A1 | 2/2002 | Talbot et al. |
| 2003/0082335 A1 | 5/2003 | Clyne |
| 2004/0137190 A1 | 7/2004 | Lasko |
| 2004/0171321 A1 | 9/2004 | Plant |
| 2005/0014437 A1 | 1/2005 | Yoshida |
| 2005/0273911 A1 * | 12/2005 | Skiba ..................... A42B 3/063 2/412 |
| 2006/0228967 A1 | 10/2006 | Gladfelter |
| 2007/0289688 A1 | 12/2007 | Abrams |
| 2008/0193709 A1 | 8/2008 | Han |
| 2008/0274326 A1 | 11/2008 | Kim et al. |
| 2010/0028552 A1 | 2/2010 | Stieber |
| 2011/0209595 A1 | 9/2011 | Han |
| 2012/0177861 A1 | 7/2012 | Eleazer et al. |
| 2012/0186002 A1 | 7/2012 | Bhatnagar et al. |
| 2013/0115408 A1 | 5/2013 | Abrams et al. |
| 2013/0122256 A1 | 5/2013 | Kleiven et al. |
| 2013/0298317 A1 | 11/2013 | Fonte et al. |
| 2013/0330502 A1 | 12/2013 | Lewis et al. |
| 2014/0096312 A1 * | 4/2014 | Vito ....................... A42B 3/125 2/414 |
| 2014/0338104 A1 * | 11/2014 | Vito ....................... A42B 3/127 2/414 |
| 2015/0237945 A1 * | 8/2015 | Vito ....................... A42B 3/127 2/414 |
| 2015/0264993 A1 * | 9/2015 | Vito ....................... A42B 3/125 2/414 |
| 2016/0165997 A1 * | 6/2016 | Vito ....................... A42B 3/127 2/412 |
| 2016/0243787 A1 | 8/2016 | Han |
| 2016/0265157 A1 * | 9/2016 | Rice ................... B32B 27/12 |
| 2016/0302507 A1 * | 10/2016 | Lewis ................... B32B 5/022 |
| 2016/0368240 A1 * | 12/2016 | Lewis ................... B32B 5/12 |
| 2017/0208889 A1 * | 7/2017 | Husain ................ A63B 71/081 |
| 2017/0273388 A1 * | 9/2017 | Vito ................... A42B 3/20 |
| 2017/0303624 A1 * | 10/2017 | Vito ................... A42B 3/127 |
| 2018/0016719 A1 * | 1/2018 | Lewis ................... B32B 5/12 |
| 2019/0166946 A1 * | 6/2019 | Vito ................... A42B 3/127 |

OTHER PUBLICATIONS

Dunne, L.E., et al., "Initial Development and Testing of a Novel Foam-Based Pressure Sensor for Wearable Sensing", Journal of NeuoEngineering and Rehabilitation, 2(4): 7 pages, (2005).

Liu, Y., et al., "Compression Behavior of Warp-Knitted Spacer Fabrics for Cushioning Applications", Textile Research Journal, 11 pages, Aug. 2, 2011, downloaded from URL:http://trj.sagepub.com/content/early/2011/07/31/0040517511416283.

Qiao, P., et al., "Impact Mechanics and High-Energy Absorbing Materials: Review", Journal of Aerospace Engineering, 21(4):235-248 (2008).

Torg, MD, J.S., et al., "Retrospective Report on the Effectiveness of a Polyurethane Football Helmet Cover on the Repeated Occurrence of Cerebral Concussioins", The American Journal of Orthopedics, 28(2):128-132 (1999).

Notification of Transmittal of the International Search Report and the Written Opinion of the International Searching Authority for PCT/US2016/020341, "Structured Flock Fiber Reinforced Layer", dated Jul. 25, 2016.

International Search Report, PCT/US2014/067883, dated Mar. 31, 2015, pp. 12.

* cited by examiner

ADD-ON IMPACT ENERGY ABSORBING PAD STRUCTURE FOR OUTSIDE OF MILITARY AND SPORT HELMETS

GOVERNMENT RIGHTS

Portions of this invention was made with Government support under (Project: W911QY-15-C-0068) awarded by the DoD, US Army Natick Labs. The Government has certain rights in the invention.

FIELD OF THE INVENTION

The invention relates to energy absorbing pads for cushioning, mitigating and detecting mechanical impact loads and use of these pads in sports and military protective gear including military helmet warfighter applications, sport helmets (e.g., football, hockey, field hockey, etc.), police: riot helmets and construction hard hats.

BACKGROUND

The need for energy absorbing padding to cushion mechanical impact loads is present in many environments. For example, personal protection equipment such as helmets, shin guards and body part protectors typically include some form of cushioning layer. The type of helmet commonly used in football (i.e., American football), for example, has a hard, outer shell that generally is molded of impact resistant plastic such as acrylonitrile butadiene styrene (ABS) or polycarbonate. The interior of the helmet is lined with various components that may be formed, for example, from various materials such as felt, fibrous knits, foam-padding material such as ethylene vinyl acetate, vinyl nitrile or urethane/rubber. Inflatable shaped air bladders are also commonly used in sports helmets. The liner is included in the design of the helmet and functions to provide some cushioning of direct physical head impacts during active play.

Presently, much research and development as well as medical studies are on-going on the effects sport action has on injurious head impact and Traumatic Brain Injury (TBI) including concussions. New sport helmet designs and helmet padding materials are constantly being investigated in the context of mitigating the effect of head impact occurrences and their severity in the contact sports. Along with this is the concept of employing sensors in these sport helmets (e.g., American Football) that would be able to detect sport injury impact "strike" or "hit" intensity and direction of impact.

Other environments where high impact forces are present are those involving body armor. For example, bulletproof vests typically are fabricated from polyaramid (Kevlar®), ultra high molecular weight polyolefin fibers, woven or mat fabrics having high impact and cut resistance. When struck by a projectile, these vests and similar clothing can impress a direct force on the wearer's body area that, while potentially life-saving, can cause significant bodily bruising and/or a bone fracturing injury if not properly cushioned against the body.

In practice, textile based spacer fabrics (by themselves) are presently considered to be breathable alternatives to Foam in Impact Energy (Helmet and Body pad) applications. For example, a product like DEFLEXION® is a textile structure type spacer fabric product that was being produced and marketed by Dow Corning Corp for ski-jacket padding. Also, Hong Kong Polytechnic University has been studying spacer fabrics for motorcycle helmet padding applications.

It is desirable in these and in other environments where impact forces are involved that the helmet or protective garment be comfortable and in some applications, that it has the ability to allow airflow between the user's body and the helmet or protective garment. It also is desirable to provide a liner construction adapted for use in such environments that is reasonably flexible, can be formed into various shapes, displays an energy absorbing compression function, can be worn close to the body and enables airflow between the body and the protective helmet or garment.

There is a need in sport and military helmet design to develop a helmet pad material device that would be able to detect and/or record and/or transmit signals that sense the intensity, location and duration of a mechanical "hit" to a helmet or protective body apparel. The concept of detecting and sensing mechanical impact strikes would also apply to biomedical sensors such as noncontact ECG sensors, respiratory sensors, sport and military body protection apparel systems. Polymeric body sensors have been described in "Wearable sensors;" Sarah Brady, et al., Studies in Health Technology and Informatics, Volume 117, pp 80-88 (2005).

A study of polyurethane rubber covers that have been applied to the outside of football helmets has been reported in "Retrospective report on the effectiveness of a polyurethane football helmet cover on the repeated occurrence of cerebral concussions," by Torg, et. al., Am. J. Orthop (Belle Mead N.J.) 1999; 28(2):128-32.] In the 1990's, when these tests were carried out, it did not seem that football helmet covers provided any protection against recurring concussions. However, this study was tainted by uncertainties in the fact that the human subjects in the study had already suffered concussions. It is well known that athletes with a history of concussions are significantly more prone to new concussions than players with no previous history of concussions. However, this study has not curbed the idea of using football helmet covers in high school football practice sessions and other non-league scrimmages. There are presently at least two sporting goods companies, Champion and Guardian who presently have football helmet cover products on the market. In fact, many high school football programs have adopted using these helmet covers in practice. The overall use of such covers in actual competition has not yet caught on. In this context, there seems to be a potential opportunity for other means of accomplishing outside-the-helmet shell impact blunting technology.

It is desirable in these and in other environments where impact forces are involved that the helmet or protective garment be comfortable and in some applications, that the garment has the ability to allow airflow between the user's body and the helmet or protective garment. It also would be desirable to provide a liner construction adapted for use in such environments that is flexible, can be formed in various shapes, displays an energy absorbing compression function, can be worn close to the body and may enable airflow between the body and the protective helmet or garment. Traumatic Brain Injury (TBI) and concussion causing head strikes in sports, especially football and hockey, are a topic of great contemporary concern to the professional, collegiate, high school and other youth sports groups. Concern about long term health effects of head strikes has now reached dramatically high social and legal interest levels. Therefore, any ideas put forth on ways of mitigating damaging head injuries in sports are welcome to all of society and especially the sports industry. In all sport helmet designs, fabrications and structures, the inside of the helmet is almost always fitted with energy absorbing pads, foam, air bladders, felt and other fibrous materials such as spacer fabric textile structures.

There are some conventional systems that use flocked fibers on the outside of sport helmets for horse riding and polo sports. However, flocked polo helmets are mainly for aesthetic effect; outside of helmet flocking with black fibers results in a non-glare, light absorbing, non-reflecting helmet surface. Also, some of these riding helmets use simple single side flocked inner linings to provide some against-the-head comfort. However in this case there is no mention of the helmet's impact energy absorbing capability. Furthermore, these flocked polo helmets do not indicate they have the proper type of flock material or coating configuration that will be needed for impact energy absorption. It is noted that in the equestrian sports, the issue of head injury is also important.

Currently, head protection in American football is in the form of a shaped, hard/tough molded plastic helmet whose interior is fitted with energy absorbing pads and the like. In this scenario, an impact strike (e.g. helmet-to-helmet) will first hit the hard plastic helmet shell—this kinetic energy will then be transferred to the inside positioned helmet pads which are there to absorb energy before in reaches the wearer's head. These interior pads function to lower the impact energy of this outside-the-helmet hit to a minimum level. This hit-to-the-head is presently blunted by only the interior helmet pad system. Since the hard plastic helmet material does not absorb much of a hit's kinetic energy, it is the helmet's interior pad system that is responsible for absorbing most of this impact energy. In fact, the hard plastic helmet can sometimes serve as a conduit for spreading a strike's impact energy throughout the whole helmet. Therefore it would be desirable to modify a standard issue helmet cover such that a certain degree of energy absorption could be imparted to the helmet if helmet were to be fitted with the modified helmet cover.

SUMMARY

Embodiments disclosed herein include an Add-On Impact Energy Absorbing (IEA) Pad system that is readily attached to an existing (standard issue) Advanced Combat Helmet (ACH) with little or no modification to the existing standard issue helmet. Additional IEA is imparted to the ACH when a pad modified system is fitted with this specially modified helmet cover. This IEA pad modified helmet cover is designed as to be readily affixed to the ACH without virtually any major instruction to the Warfighter. The modified helmet cover could be attached to an ACH in the same manner as an un-modified Helmet Cover. Flocked Energy Absorbing Materials (FEAM) are employed in creating the actual IEA pad modified Helmet referred to as a flocked helmet cover pad (FHCP) insert.

In one embodiment, the FHCP is not physically attached to the hard shell of the Helmet (Military or Sport). The multi-layer FEAM pads are fixed (via Velcro®) to the fabric sewn Helmet Cover. There is no physical attachment of these pads to the hard shell helmet. The helmet cover is adjustably attached to the bottom perimeter of the hard shell helmet. In fact indications are that if these FHCP pads were physically attached to the Hard Shell helmet, their Impact Energy Absorption properties of this arrangement upon impact would be lower. The fact that these FEAM containing pads can move/slide/skid across the rough surface of the hard plastic-composite helmet shell upon impact strikes provides additional energy absorbing frictional effects.

In one embodiment, a flocked helmet cover pad (FHCP) attachable to a helmet cover includes a central hub comprising a first multi-layer FEAM pad, a plurality of appendages, each appendage comprising a second multi-layer FEAM pad and attached to the central hub, each appendage is shaped and arranged to provide additional impact energy absorption properties for a helmet. Such an arrangement provides additional energy absorbing frictional effects without physically altering, changing or physically modifying the hard shell helmet material itself and can be used without any special extra training of the Warfighter.

In another embodiment, one of the FEAM layers has a substrate comprising an outer surface of a helmet shell outer surface, second ends covered by a flexible sheet that is impregnated with an abrasion resistant coating and a low friction surface coating disposed on the abrasion resistant coating on the flexible sheet. In another embodiment, an integrally flocked, impact absorbing outside covering system for a sport helmet includes a helmet shell having an outer surface, a plurality of flock fibers having first ends disposed on the outer surface of the helmet shell and second ends, a flexible sheet that is impregnated with an abrasion resistant coating at least partially covering the second ends and a low friction surface coating disposed over the abrasion resistant coating on the flexible sheet.

A method for making a flocked helmet cover pad (FHCP) attachable to a helmet cover includes assembling a central hub comprising a multi-layer FEAM pad, assembling a plurality of appendages comprising multi-layer FEAM pads and attaching the plurality of appendages to the central hub.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

Combinations of multiple FEAM layers and fabric, sheet, film, spacer fabric and foam dividers form very effective, flexible, fibrous energy managing composite panel for impact force and energy absorption applications. A synergistic effect has been discovered in some FEAM/spacer fabric and FEAM/foam embodiments, namely, that the percentage force losses upon mechanical impact of certain types of combined/layered FEAM/divider composite panels are higher than the percentage force loss of each of the individual components.

Figure 1:
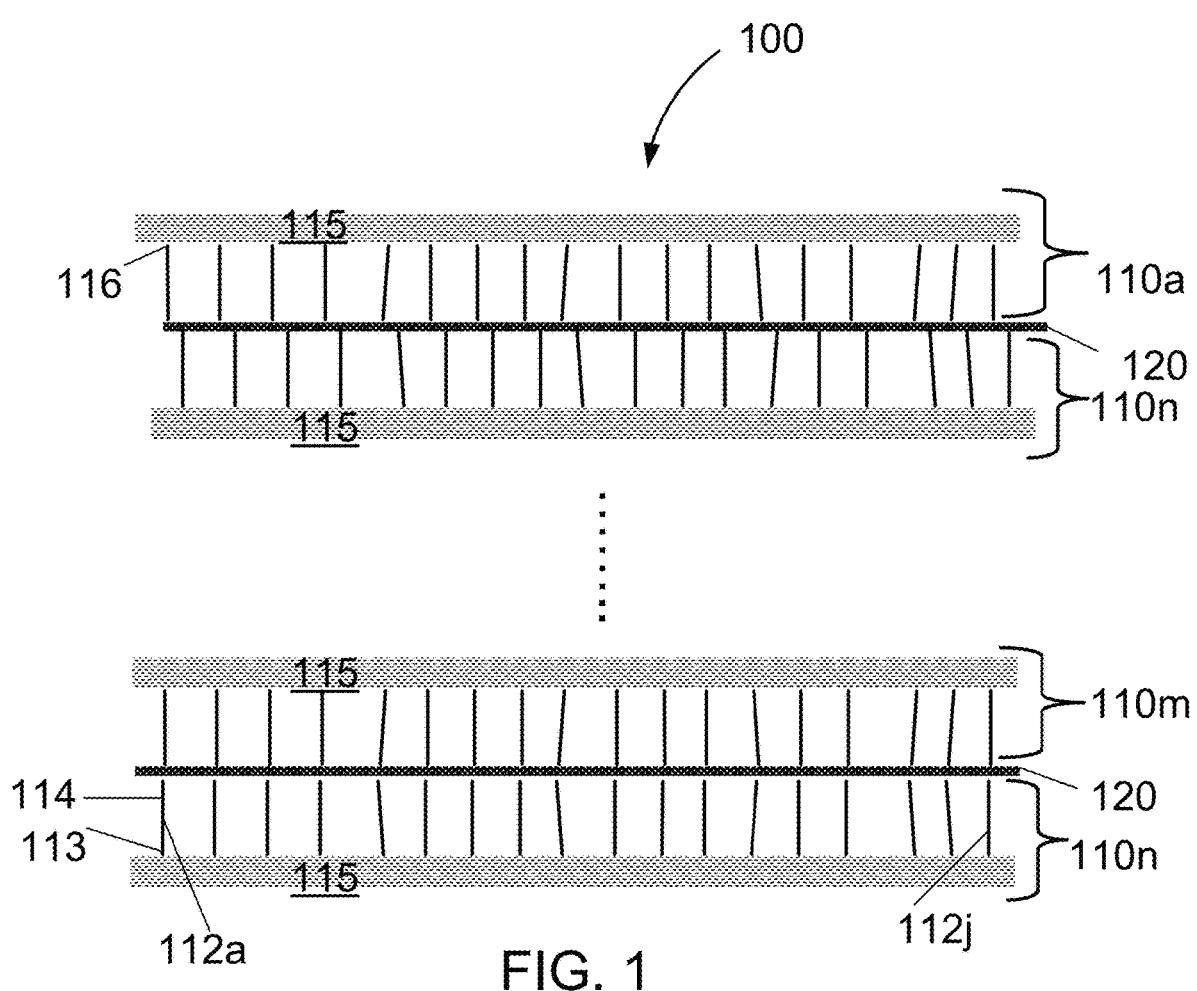
FIG. 1 is a schematic diagram of a fibrous energy managing composite panel in accordance with one example embodiment disclosed herein.

Now referring to FIG. 1, an exemplary flexible, fibrous energy managing composite panel 100 (also referred to as a FEAM panel 100) includes a plurality of flocked energy absorbing material (FEAM) layers 110a-110n (commonly referred to as FEAM layers 110 or flocked FEAM layer). Here, each single side flocked FEAM layer 110 includes a substrate 115 having a first surface 116, a multiplicity of monofilament fibers 112a-112j, each having a first end 113 and a second end 114, the fibers being attached, at their first ends 113 to the first surface 116 of the substrate 115 with the second ends 114 of the fibers extending away from the first surface 116 of the substrate 115. The panel 100 further includes at least one divider 120 (e.g., fabric, sheet, foam, spacer fabric or film) disposed between two layers (i.e., the divider separates the loose ends of the flocked fibers of two adjacent FEAM layers of the plurality of FEAM layers, here FEAM layers 110m and 110n. It is understood that the single side FEAM layers can be arranged (e.g., stacked) face-to-face (i.e., two single-side flocked positioned to face each other flock side to flock side) as shown in FIG. 1, back to front (e.g., with a divider or where the substrate 115 serves as a divider, or back to back (e.g., with two substrates adjacent each other).

The substrate 115 includes, but is not limited to, a polyester nonwoven fabric, a polyamide nonwoven fabric, a woven polyester fabric, a woven polyamide fabric, a knitted polyester fabric and a knitted polyamide fabric. In various embodiments, the monofilament flock fibers 112 each have a fineness in the range of about 1 denier to about 60 denier and a length between about 0.5 mm to about 12 mm. The monofilament fibers 112 include, but are not limited to, polyamide fibers, polyolefin fibers and polyester fibers. In one embodiment, an adhesive is used to bond the monofilament fibers 112 onto the substrate 115.

When laying or plying together two or more FEAM layers 110 in forming the composite panel 100 the divider 120 (e.g., separator sheet or layer of thin fabric) is placed between the ends of the flock fibers of adjacent FEAM layers. This divider 120 is used to prevent the intermeshing of the contiguous FEAM layers 110. It was experimentally determined that multi-layer FEAM panels without separators had lower percentage Force Loss properties in Ball-Drop impact tests. In the −20° C. to +60° C. temperature range, the Impact Force/Energy properties of FEAM panels disclosed herein do not change greatly with temperature variations compared to conventional FOAM materials. Additionally, FEAM panels have excellent "multiple hit," material recovery properties (i.e., much better than any of the foam only materials tested).

In one embodiment, the stacked FEAM layers 110, interleaved dividers 120, and an outer wrapping fabric (shown below) are secured together into the final flexible, fibrous energy managing composite panel 100 by sealing or sewing the perimeter of the components of the panel 100 to hold the panel 100 together. Perimeter sewing can be accomplished by sewing a simple straight stitch or a designed double stitch around the edges of the panel. Double stitching can be accomplished using, for example, a Serger type sewing machine which is designed to sew a double "box-like" stitch to secure the panel 100. A Serger machine stitch is commonly used to produce a clean and secure edge-finishing stitch when securing the edges of a multiple layer fabric or fibrous materials. Alternatively, sealing the edges of the panel 100 can be accomplished using a suitable adhesive such as a polyurethane or acrylic based adhesive. In another embodiment, heat sealing the perimeter is used to secure the panel 100. If the composite panel 100 includes thermoplastic fiber material, the perimeter of the panel can be heat, microwave or ultrasonically sealed or bonded. Heat, microwave and ultrasonic sealing and bonding techniques are known in the art of industrial fabric assembly. In another embodiment, spot stitching is used to stabilize the interior of composite panels. Through-the-panel simple short stitches are sewn into the panel at various spots similar to quilting. This "spot quilting" is useful to stabilize large area FEAM composite panels.

Figure 2:
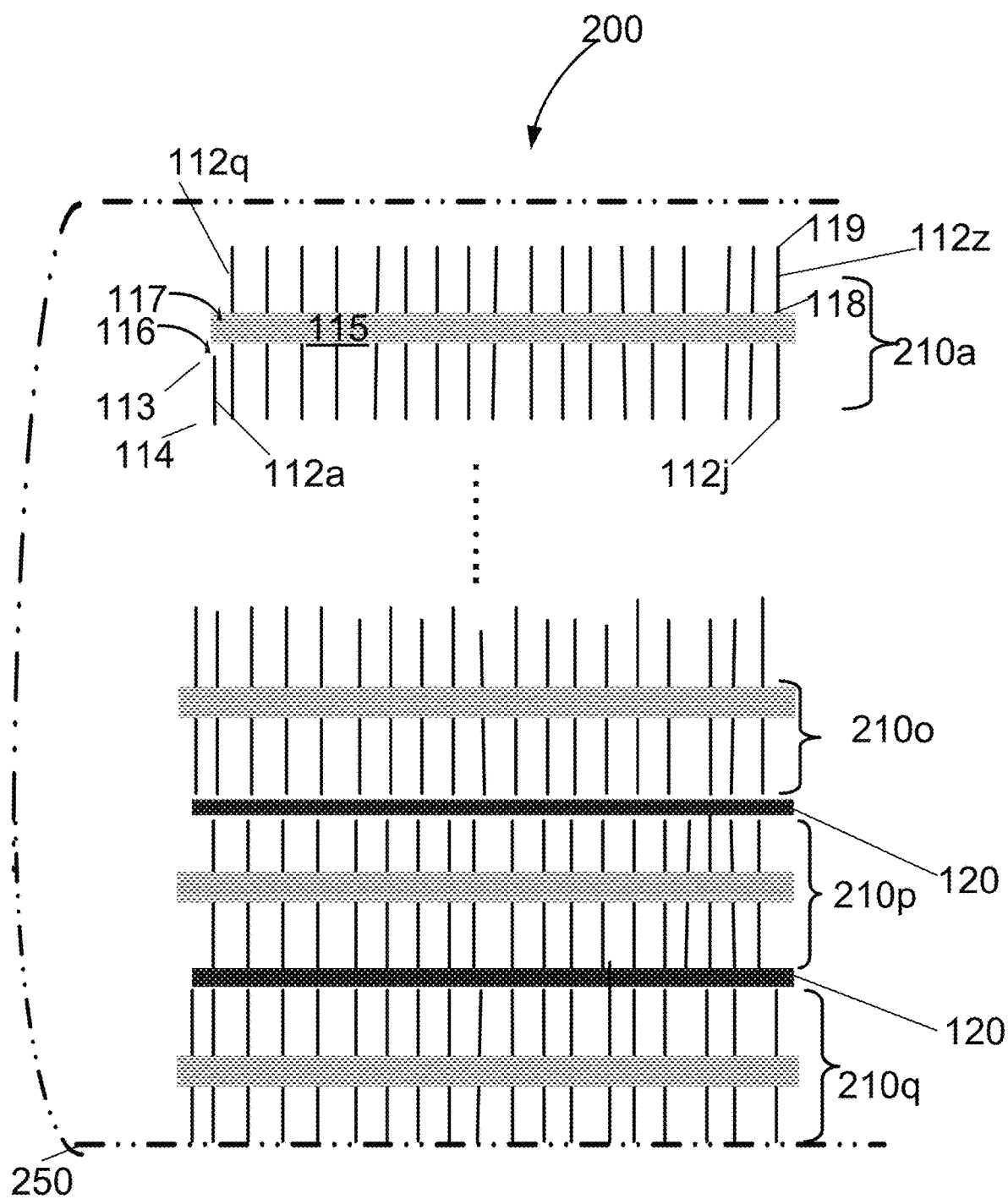
FIG. 2 is a schematic diagram of an alternate embodiment of the composite panel of FIG. 1 having double side FEAM layers and an outer wrapping fabric.

Now referring to FIG. 2, a flexible, fibrous energy managing composite panel 200 similar to panel 100 of FIG. 1 includes double side flocked FEAM layers 210a-210q (referred to commonly as double side FEAM layers 210, double side FEAM layers 210, or dual FEAM layers 210). The double-side flocked FEAM layers 210 are similar to FEAM layers 110, but include a second multiplicity of monofilament fibers 112q-112z, each having a first end 118 and a second end 119, the fibers 112 being attached, at their first ends 118 to a second surface 117 of the substrate 115 with the second ends 119 of the fibers extending away from the second surface 117 of the substrate 115.

In one embodiment, multiple of double side FEAM layers 210 are stacked together and separated with dividers 120 (e.g., sheets, fabrics, films etc.). In another embodiment, the composite panel 200 also includes an outer wrapping fabric 250 disposed to cover at least one surface of at least one FEAM layer 210. In other embodiments, the outer wrapping fabric 250 completely surrounds the composite panel 200. The outer wrapping fabric 250 includes, but is not limited to a woven/knitted polyester fabric, a woven/knitted polyester fabric having at least one napped surface, a woven/knitted polyamide fabric having at least one napped surface, a thin, flexible knitted spacer fabric having at least one napped surface, a thin, flexible woven spacer fabric having at least one napped surface, a polyester fabric having at least one terrycloth surface and a polyolefin fabric having at least one napped surface. In one embodiment, the outer wrapping fabric 250 surrounds the entire composite panel 200. In another embodiment, the outer wrapping fabric 250 comprises a smooth surface disposed towards a wearer of the panel to provide a more comfortable surface (e.g., next to the wearer's skin). An in yet another embodiment, the outer wrapping fabric 250 comprises a surface to accommodate the hook portion of a loop and hook closure (e.g., Velcro® Veltex® fabric). In another embodiment, the outer wrapping layer fabric 250 comprises a layer of thin (about 2 mm (0.079") to about 6 mm (0.236") thick) spacer fabric textile structure one side of which has a napped surface.

Ball Drop Force Loss testing composite of panels 200 including one, two, three and four of double-side flocked FEAM layers 210 determined that the greatest Force Loss was achieved when two or three layers were combined. Adding four (or more) FEAM layers 210 in certain embodiments did not result in a proportionally greater Force Loss increase. Therefore a two or three FEAM layer 210 (with dividers 120 between each of the FEAM layers 210) composite panel 200 is a cost effective layer combination.

There are several ways of fabricating a composite FEAM panels including:
flocking fibers on a substrate to produce FEAM layers;
processing a plurality of FEAM layers to provide breathability and flexibility;
assembling the plurality of FEAM layers and at least one divider disposed between two adjacent FEAM layers in a stacked configuration; and
interleaving at least one divider between adjacent flocked surfaces of two of the plurality of FEAM layers. The FEAM layer can be a single side, a double side FEAM layer or a combination of both. Further processing of the composite panel can include enveloping the FEAM layers (or the entire FEAM panel) in a fabric cover.

Figure 3:
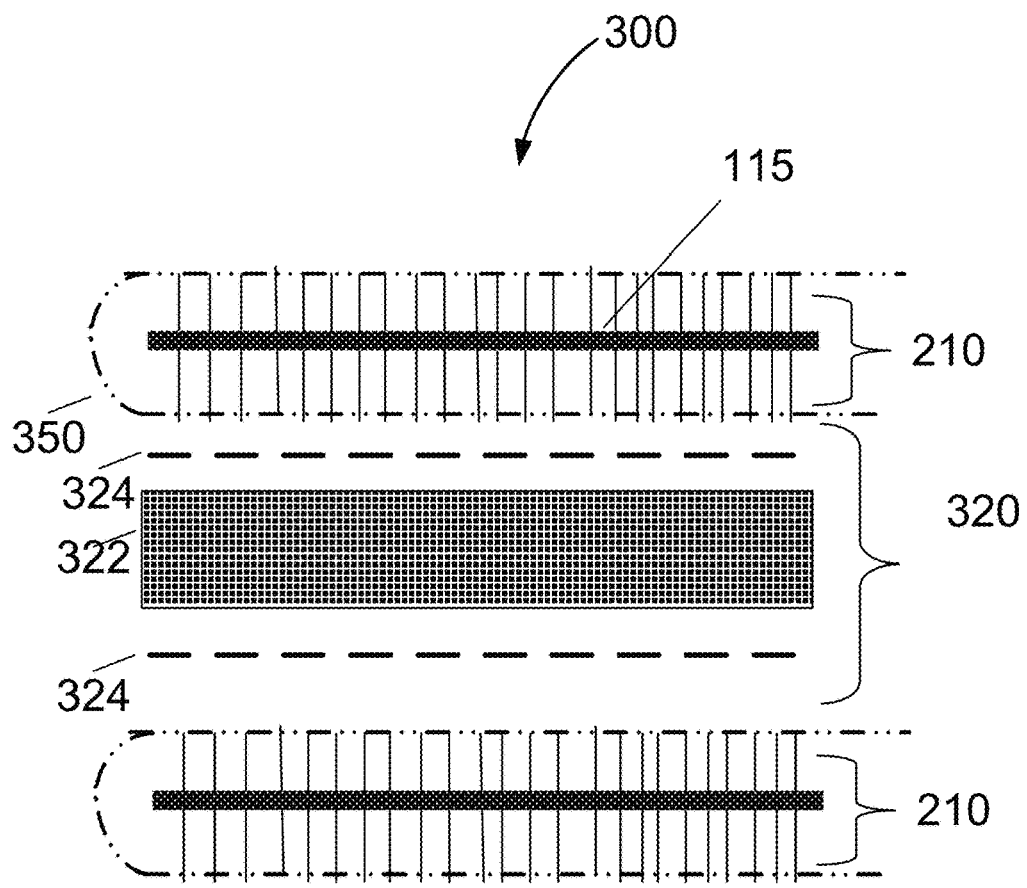
FIG. 3 is an exploded schematic diagram of an alternate embodiment of the composite panel of FIG. 2 with a foam layer divider and a FEAM layer with an outer wrapping fabric.

Now referring to FIG. 3, in one embodiment a composite panel 300 similar to panel 200 uses a foam layer as a divider 320. Here the double side FEAM layer 210 is at least partially covered by the outer wrapping fabric 220. In one embodiment the FEAM layer 210 and the foam divider 320 are joined together with rubber cement or other flexible adhesive. In one embodiment, the foam layer divider has a thickness of about 2 mm (1/16") to about 20 mm (3/4").

In another embodiment the FEAM layers 210 and the foam dividers 320 are joined together by over-wrapping/enveloping the completely panel 300 with a fabric cover. In this embodiment, there is no adhesive or bonding between the FEAM layers 210 and the foam dividers 320 of the energy absorbing panel 300 (i.e., the composite panel is held together by the integrity of the enveloping fabric wrap).

In one embodiment, the divider 320 includes a foam section 322, here perforated vinyl nitrile foam with 6.4 mm (1/4") perforations. The divider 320 can also include optional polyester fabric sheets 324 to cover the foam section 322 surfaces adjacent to the FEAM layers 210. This configuration is significantly light weight (low areal density) and has high impact energy absorption (EA) capabilities. It is understood that the outer wrapping fabric 350 may include a single material or multiple sections made of different materials (e.g., a napped outer surface fabric GT-758 manufactured by Gehring-Tricot Corp. and VelTex® manufactured by Velcro USA Inc. VelTex®) and can surround either completely or partially an entire panel or individual layers.

Ball Drop testing on the FEAM/FOAM layered composite panel 300 determined that striking the panel on the FEAM SIDE hit position (i.e., the FEAM side on top) produced a higher (through thickness) Force Loss percentage than the FOAM SIDE "hit" position. To provide equal side Force Loss percentage energy absorption, one embodiment includes FEAM layers 210 on both sides of the divider (e.g., a central foam layer).

Figure 4:
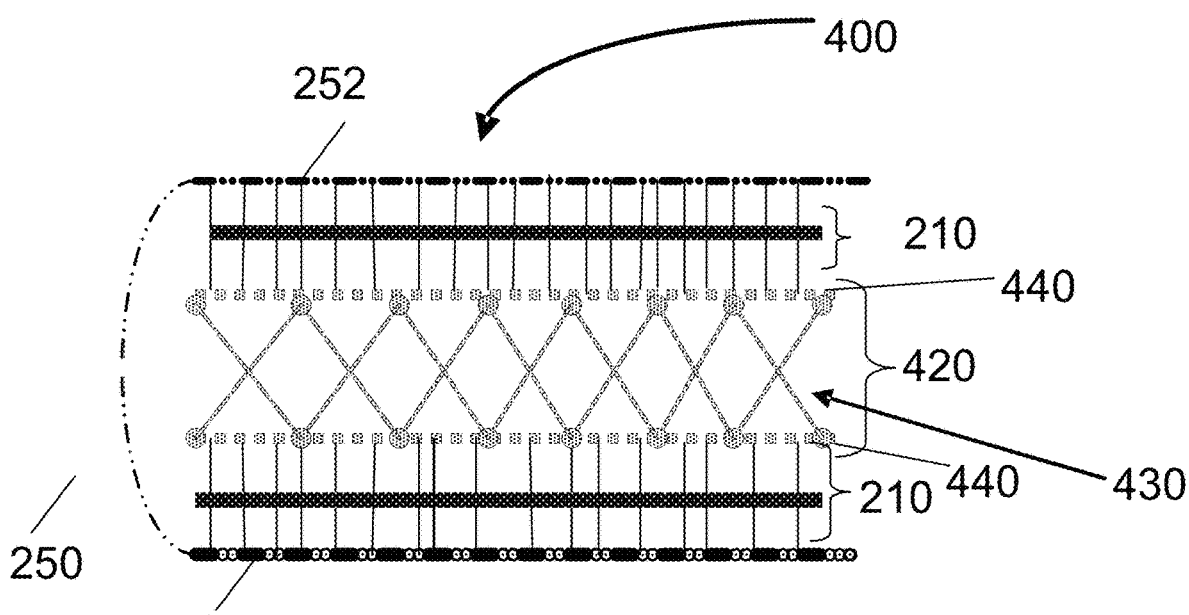
FIG. 4 is a schematic diagram of an alternate embodiment of the composite panel of FIG. 2 with a spacer fabric layer divider and a FEAM layer with an outer wrapping fabric.

Now referring to FIG. 4, in one embodiment a composite panel 400 similar to panel 200 includes a divider 420, here, a spacer fabric (e.g., a three dimensional textile structure). In one embodiment, the composite panel 400 is completely enveloped by the outer wrapping fabric 250 which can include multiple sections 252 and 254. The divider 420 includes a core 430 disposed between integrally attached outer layers 440. In other embodiments the divider includes, but is not limited to, a warp knitted spacer fabric (WKSF), a polyester WKSF, a polyamide WKSF, a thin polymer film fabric, a thin nonwoven fabric, a foam layer, a knitted spacer fabric, a Weft knitted spacer fabric or a woven spacer fabric, and a felt layer. The "synergistic effect" of enhanced energy absorbing properties is most pronounced in FEAM/WKSF (spacer fabric configurations) and some FEAM/Foam material "divider "layer combinations.

Spacer Fabrics are a specialized fabric structures fabricated by weaving, warp knitting and weft knitting. One of the most common types of Spacer Fabrics is a Warp Knitted Spacer Fabric (WKSF) that is made on a double-needle bar Raschel knitting machine. WKSF fabrics are three-dimensional textile structures including the integral outer layers 440 (an upper and lower planar fabric-like outer surface layers) that are joined together but kept apart by the core 430, of monofilament structural spacer yarns. These monofilament spacer yarns form an open "core" structure between the planar outer fabric-like surfaces of "pile" spring-like mono-filament cross members that have flexible compression properties. This core is also an open structure allowing for the more-or-less free passage of air and moisture giving the complete structure its higher breathe-ability or water vapor transmit-ability (WVT) compared to foam and other impact blunting materials.

In one embodiment, a versatile FEAM composite panel is provided by integrating the overall mechanical compression properties of the spacer fabric divider 420 with FEAM elements. Here, the integral outer layer of the spacer fabric is in a close enough knit of planar (small hole porosity) to act as the divider 420. In certain embodiments, the mechanical compression behavior of the FEAM panel can be "tuned" by adjusting the mechanical profile of the spacer fabric in each FEAM layer so that a "designable" smooth, load-deflection curve (in compression) is achieved.

In one embodiment, the outer wrapping fabric 250 include multiple sections 252, here, a napped outer surface fabric GT-758 manufactured by Gehring-Tricot Corp. and section 254, here, a VelTex® having an outer Velcro® loop structure manufactured by Velcro USA Inc. VelTex® is a laminar fabric with one side adapted to receive Velcro® hook fabric. This configuration is significantly light weight (low areal density), comfortable and has high impact energy absorption (EA) capabilities. It is understood that the outer wrapping fabric 250 can include multiple sections as shown here or may be a single fabric to completely or partially envelop the multiple layers and dividers. In this embodiment the divider 420 is a GT-730 Spacer Fabric open structure manufactured by Gehring-Tricot Corp.

Figure 5:
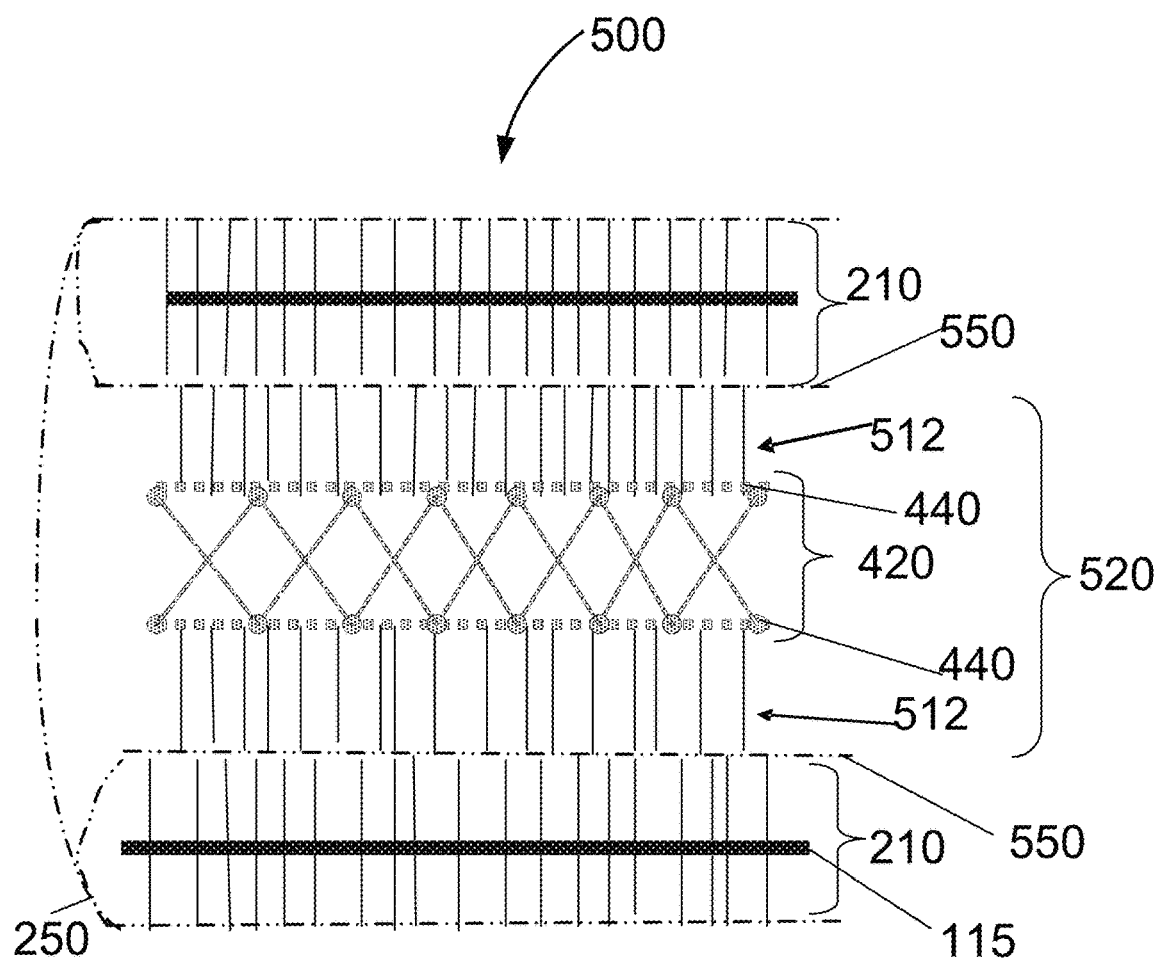
FIG. 5 is a schematic diagram of an alternate embodiment of FIG. 2 with a spacer fabric divider and an outer wrapping fabric.

Now referring to FIG. 5, in one embodiment a composite panel 500 similar to panel 400 includes a WKSF divider 520 where the spacer fabric divider 420 includes additional fibers 512 flocked on both sides of its planar fabric upper and lower outer surfaces 440. When this outer surface flocked WKSF structure is sandwiched between two double side FEAM layers, the flocked fibers 512 incorporated in the divider 5201 increases the springiness and therefore the EA properties of the combined composite panel 500.

Figure 6:
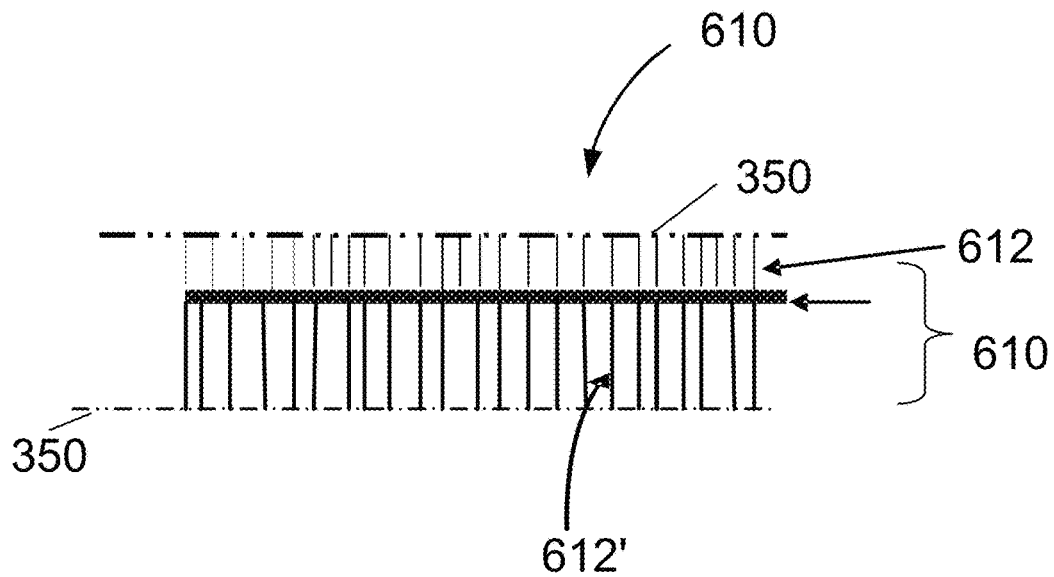
FIG. 6 is a schematic diagram of double side FEAM layer having different length fibers on opposite sides of the substrate in accordance with one example embodiment disclosed herein.

Now referring to FIG. 6, a FEAM layer 610 similar to FEAM layer 210 includes on one side of the substrate 115, a first multiplicity of lower denier, shorter, softer, more comfortable monofilament fibers 612 and on the other side, a second a multiplicity of higher denier, longer, stiffer monofilament fibers 612'. When combining FEAM layers and foam dividers or spacer fabric dividers it is advantageous to have the side of the FEAM that is in contact with the human body part (for cushioning and breathability comfort) be a soft and have a comfortable feel as possible. High denier (stiff, coarser) flocked FEAM surfaces have less contact comfort but better energy/force absorption. Lower denier (less stiff, softer) flocked FEAM surfaces have better contact comfort but lower energy/force absorption. To accommodate this feature in a FEAM layer, the FEAM layer is flocked on the more springy and energy absorbing side with a higher denier flock fiber (having a fineness of between about two and about 60 denier and the other softer and more skin touchable side with a lower denier flock fiber (having a fineness of between about one and about 10 denier). This different size of flock on each side of a double side flocked FEAM layer 610 (also referred to as a dual-size double side FEAM layer 610) design also works very well when combined with double-side flocked FEAM layers where the dual-size double side flocked FEAM layers are oriented in the resulting composite panel such that the softer, more comfortable-to-the-touch side of the dual-size double side FEAM layer(s) are oriented towards an outer surface of the composite panel.

The flexibility, breathability and pliability of any FEAM panel are improved by, needle punching, non-barbed needle punching, perforating and slitting as described below. The FEAM layers can be hole perforated as described in FIGS. 7A-7I, needle punched as described in FIG. 8A, slit as described in FIGS. 8B-8C. Separately or in combination with the operations on the FEAM layers, the dividers can be needle punched and the substrate of each of the plurality of FEAM layers can be perforated to improve flexibility, breathability and pliability of the FEAM panels.

Figure 7A:
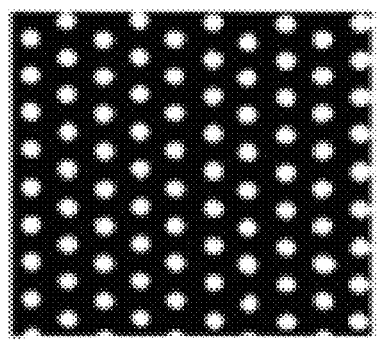
FIGS. 7A-7I are through-panel views of perforation patterns in FEAM layers in accordance with embodiments disclosed herein.
Figure 7B:
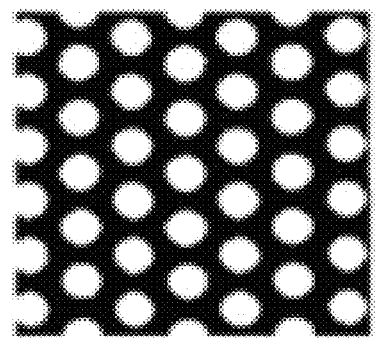
Figure 7C:
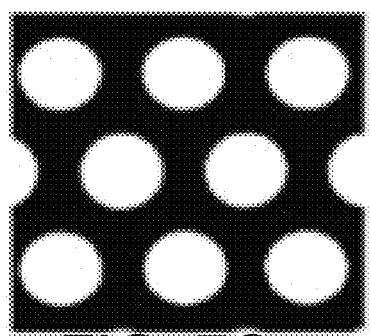
Figure 7D:
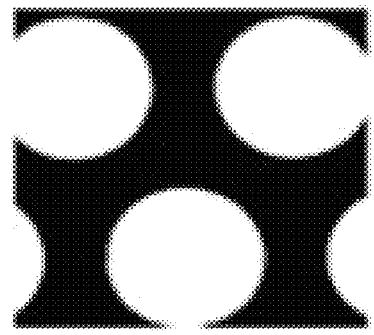
Figure 7E:
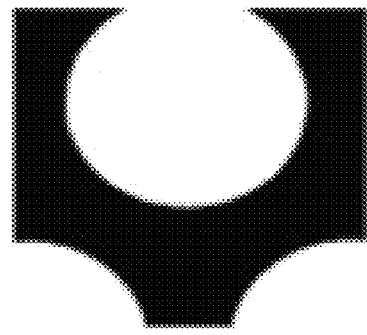
Figure 7F:
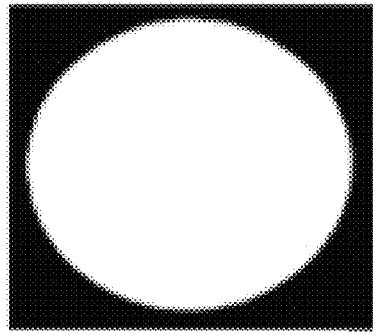
Figure 7G:
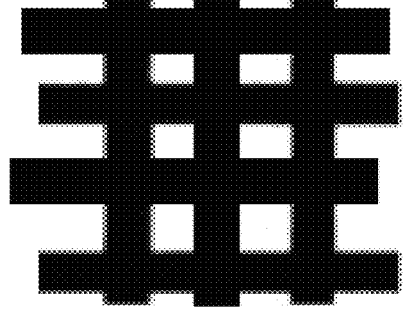
Figure 7H:
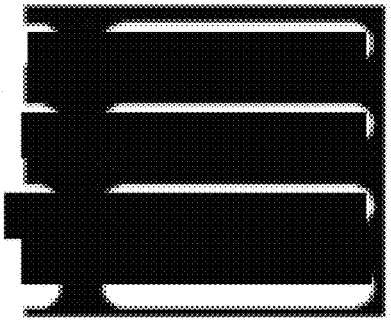
Figure 7I:
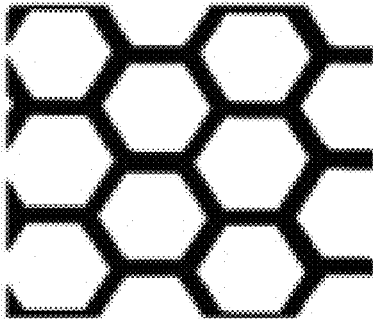

FIGS. 7A-7I illustrate exemplary perforation patterns which can be used in conjunction with the various FEAM layers described herein. One advantage of the perforated FEAM layers is that the FEAM layers are lighter in weight. In one embodiment, the areal density (weight/area) of the perforated FEAM is over 30% less than the non-perforated FEAM panel. Lower weight is an important property being sought for energy absorbing sport and military wearable padding applications. FIG. 7A illustrates a pattern 700 having perforations with about 1.6 mm (1/16") diameters on about 3.2 mm (1/8") centers. FIG. 7B illustrates a pattern 710 having perforations with about 3.2 mm (1/8") diameters on about 4.8 mm (3/16") centers. FIG. 7C illustrates a pattern 720 having perforations with about 6.4 mm (1/4") diameters on about 9.5 mm (3/8") centers. FIG. 7D illustrates a pattern 730 having perforations with about 12.7 mm (1/2") diameters on about 17.5 mm (11/16") centers. FIG. 7E illustrates a pattern 740 having perforations with about 19.1 mm (3/4") diameters on about 25.4 mm (1") centers. FIG. 7F illustrates a pattern 750 having perforations with about 25.4 mm (1") diameters on about 31.75 mm (1.25") centers. FIG. 7G illustrates a pattern 760 having rectangular perforations. FIG. 7H illustrates a pattern 770 having slotted perforations. FIG. 7I illustrates a pattern 780 having honeycomb perforations. Perforations having a square, rectangular, oval, triangular and/or hexagonal geometry are also useful perforation geometries for these FEAM layers. In one embodiment, the perforations are made in a staggered pattern with less than about 12.7 mm (1/2") separation and having a diameter less than about 6.4 mm (1/4"). In embodiments, having "open areas" of than 30 percent the EA properties and dimensional stability of the FEAM panel is somewhat reduced.

In contrast to needle punched FEAM layers (described below), FEAM layers having "shaped" perforations or perforations through their structure result in FEAM layered structures that have higher Force Loss (%) to areal density and volume density ratio properties than un-perforated FEAM layers. These perforated FEAM layers have enhanced three-dimensional breathability. The perforations in these perforated FEAM layers can be round, oval, square or triangular. In one embodiment, the perforated area (open area) in a FEAM layer does not exceed 25 percent of the total cross sectional area and in another embodiment does not exceed 30 percent. Also, the perforations should be at least an average perforation diameter distance away from adjacent perforations. Too high an "open area" of these perforated sheets results in a diminution of the panel's energy absorption during an impact hit. Material sheet perforation is accomplished manually by mechanically punching, using a shaped metal cutting die and hammer punch assembly. Sheet material hole punching is also done commercially using a reciprocating punch press and the like as is known in the art.

Figure 8A:
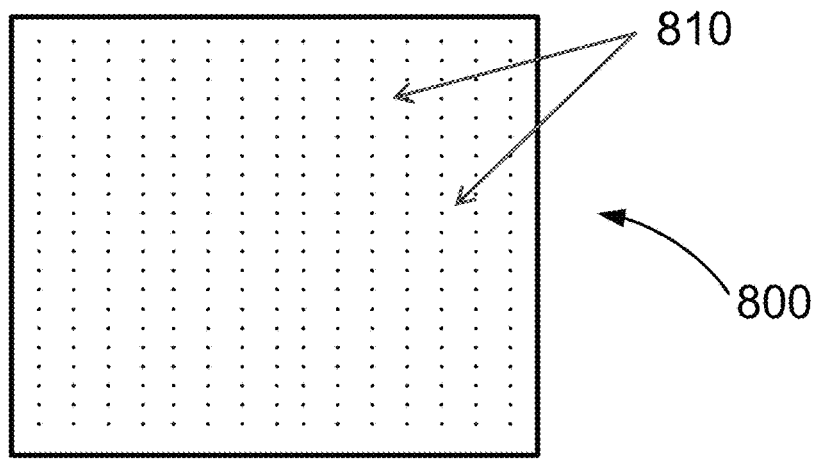
FIG. 8A is a through-panel view of a needle-punched pattern in FEAM layers in accordance with embodiments disclosed herein.

Now referring to FIG. 8A, an exemplary pattern 800 includes openings 810 made by a needle punching process which may be applied to a completed composite panel 100, 200, 300, 400, etc. or individually to FEAM layers 110, 210, etc., substrate 115, and dividers 120, 320, 420, etc. In some embodiments, composite panel 100 elements are through-the-panel needle punched. This process is a positive way of introducing three-dimensional breathability into the composite panel. In one embodiment, sewing machines without thread can be used for needle punching and in other embodiments commercial needle punching machines are used. It is understood, that while FIG. 8A depicts a regular needle punching pattern, other patterns, for example, a random needle punch pattern can be used. It is understood that needle punching can employ either barbed needles (for dry non-woven webs) of non-barbed needles for other fabrics and materials.

Figure 8B:
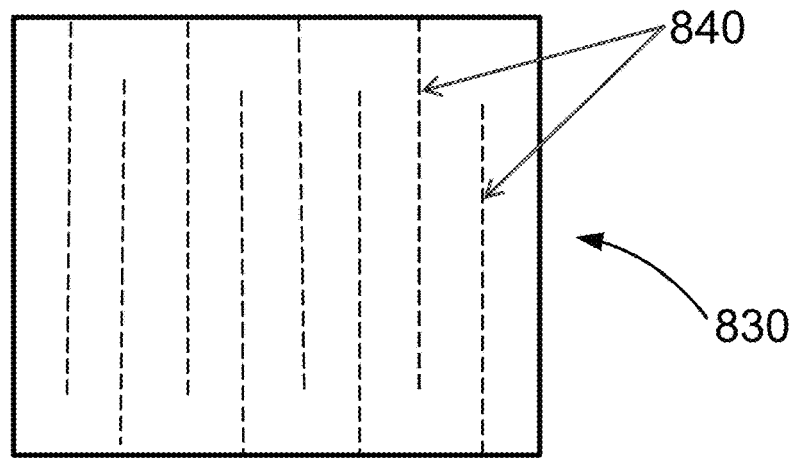
FIGS. 8B and 8C are representative through-panel views of slit patterns in FEAM layers in accordance with embodiments disclosed herein.

Now referring to FIG. 8B, an exemplary pattern 830 includes openings 840 made by a slitting process which may be applied to individual FEAM layers 100, 200, 110, 210, etc. It has been found that putting multiple slits in these FEAM panel elements makes the panel much more directionally flexible. Flexibility is important for the "fit and comfort" of the garments including FEAM panels. Various forms of multiple slit configurations have been tested, and in some embodiments the slitting pattern depends on the bending directionality needs of the product which includes the FEAM panel. It is understood that other slitting (or cutting) patterns (length, direction, shape, curvature) are possible. Slitting can be accomplished manually or by means of a fabric slit punching or cutting machine as is known in the art.

Figure 8C:
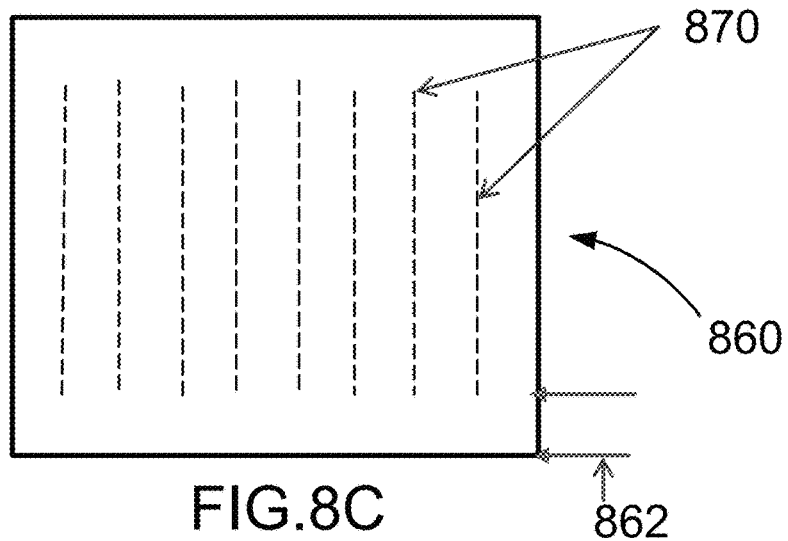

Now referring to FIG. 8C, an alternate pattern 860 includes openings 870 made by a slitting process. Here, in slit pattern 860, the slit openings plurality of slits in at least one of the plurality of FEAM layers, the plurality of slits are spaced apart from a perimeter edge 862 of the panel do not go through to the edges. This pattern maintains greater dimensional stability relative to pattern 830. It has been observed that these "inner-ply-slit" FEAM layers form FEAM panels are more flexible and pliable in the across-the-slits direction than non-slit panels. These slit containing samples feel much softer and pliable especially when bending the FEAM panel with slits perpendicular to the direction of the slits. This feature is an important consideration in the design and practice of creating FEAM containing panels for helmet pad and other body armor apparel applications. From an energy absorbing (EA) perspective, it has been shown that slitting does not profoundly alter the EA properties of FEAM layers and panels. It was found that FEAM panel slitting greatly improves the flexibility and conformability of these stacked FEAM structures. This is an important factor in the practice of designing EA helmet and body pads. Slitting of inner FEAM panels in multilayer FEAM configurations does not significantly reduce the EA properties of the FEAM assembly. However, the flexibility and conformability of FEAM panels comprising multi-ply (i.e., multiple FEAM layers with dividers (e.g., fabrics or sheets) are greatly improved by slitting.

In bodily impact and mechanical hit situations, in sport and military functional activity, there is a need to detect the intensity and direction of a particular impact in say helmets or in body protection apparel. Piezoelectric fabrics or films can be used as dividers or in conjunction with dividers to provide as a sensitive motion and force sensors to detect impacts. In the operation of piezoelectric sensors, mechanical deformation of the piezoelectric layer is converted into an electric signal which can be electronically detected and processed by standard sensor network hardware and software. The same could be done with pyro-electric fabrics of film which with changes in temperature generate an electronically detectable signal.

Embodiments described below include electro-active materials (EAM) (e.g., piezoelectric materials and electro-active flock materials) in several configurations. These configurations include, for example, combinations of EAM (fibers, yarns, films or fabrics) as dividers and FEAM layers and combinations using electro-active fibers incorporated directly into or as the flocked material fibers. The electro-active materials are an integral part of the sensing material structure or device. These systems are referred to generally as Flocked Electro-Active Sensor (FEAS) materials. The flocking of piezoelectric fibers as the flock fibers in constructing a FEAM layer is an example where the electro-active fibers are integrated into a FEAM structure. Such a panel has the combined features of energy absorption and electronic sensing capabilities.

Figure 9A:
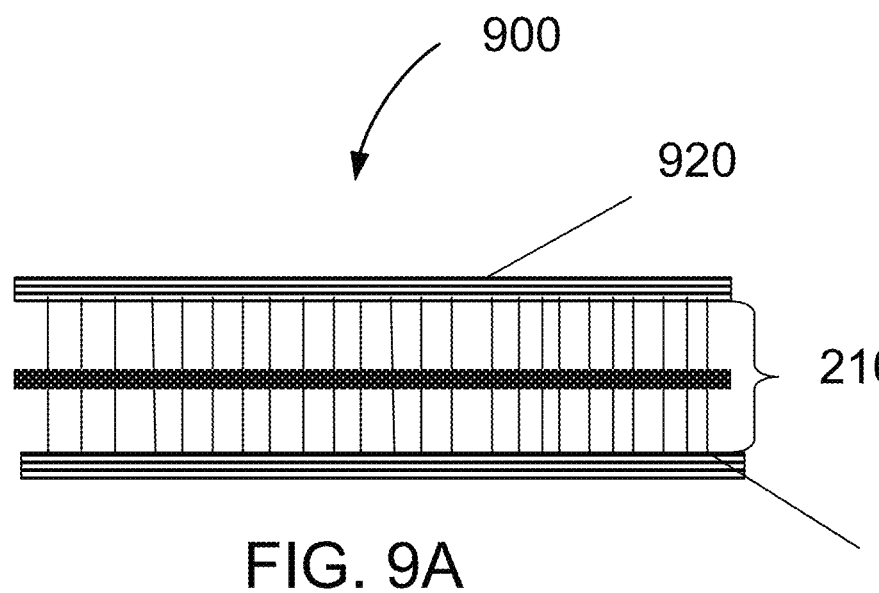
FIGS. 9A and 9B are schematic diagrams of alternate embodiments of the composite panel of FIG. 2 with a piezoelectric divider in sheet form in accordance with example embodiments disclosed herein.
Figure 9B:
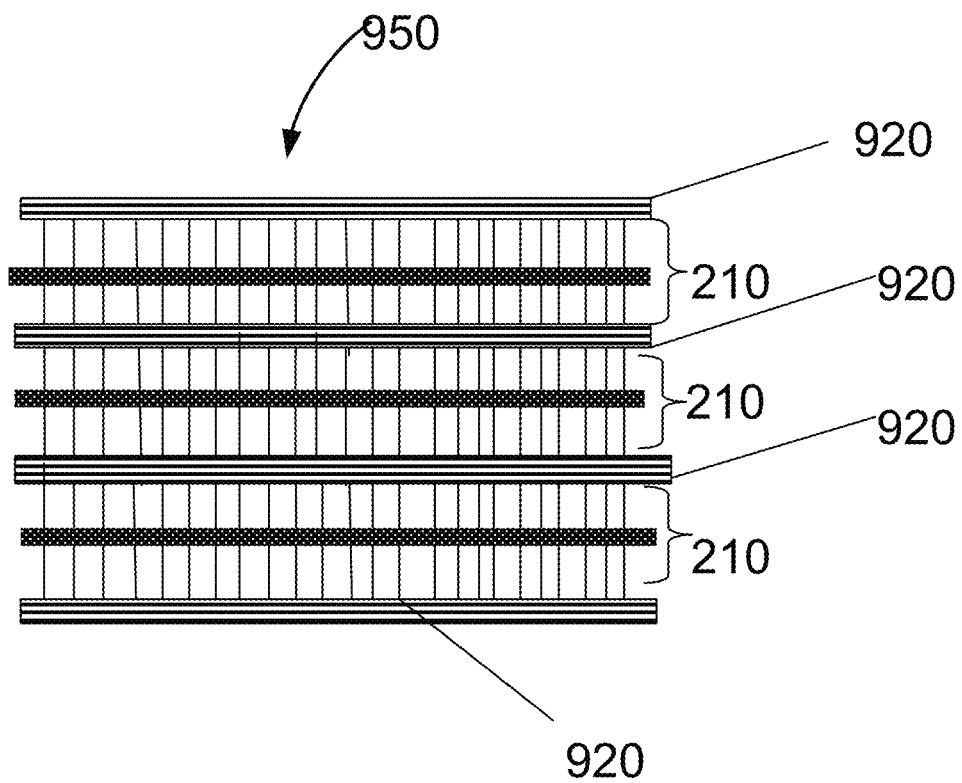

Now referring to FIG. 9A, a panel 900 includes a double side FEAM layer 210 and at least one divider 920 which includes a flexible, electro-active material (EAM) layer. Additional piezoelectric layers can be added for signal amplification. In operation, the divider 920 acts as a signal generator when deformed or flexed. Now referring to FIG. 9B, composite panel 950 (also referred to as a high sensitivity layered sensor system 950) includes four flexible piezoelectric dividers 920 combined with FEAM layers 210. Multiple interleaved piezoelectric dividers 920 provide a high signal (effectively amplifying the signal generated upon deformation or flexing of the panel 950). It is understood that the piezoelectric dividers 920 can be combined with other dividers (e.g., foam or spacer fabric) to optimize the resulting composite panel for a particular application.

The material combination of FEAM material and layers of fabric or film piezoelectric layers is readily adaptable to the field of impact energy material layers that can generate an electrical signal when it is struck by a mechanical impact. In this embodiment, the piezoelectric fabric or film is employed as an add-on layer to existing FEAM layers. In other embodiments, a flexible piezoelectric fabric is used as the substrate (e.g., center support ply) of the FEAM layers.

In other embodiments, FEAM panels include configurations where the piezoelectric signal generating layer (PEL) materials are integrated directly into the FEAM layers. Here short piezoelectric fibers are the flock fibers that are included in composite panel. The piezoelectric flock fibers included in the FEAM layer serve at least two functions: absorbing impact energy as well as detecting impact hits by producing an electrical signal when mechanically deformed by the (compression) impact. These FEAM panels can also serve as energy generating layer devices. For example placing a FEAS FEAM layer in a running or marching shoe would generate electrical energy by walking or running. A person's foot pressure would generate electrical energy that could be stored in an energy storage device (e.g., a battery or a super capacitor).

Figure 10A:
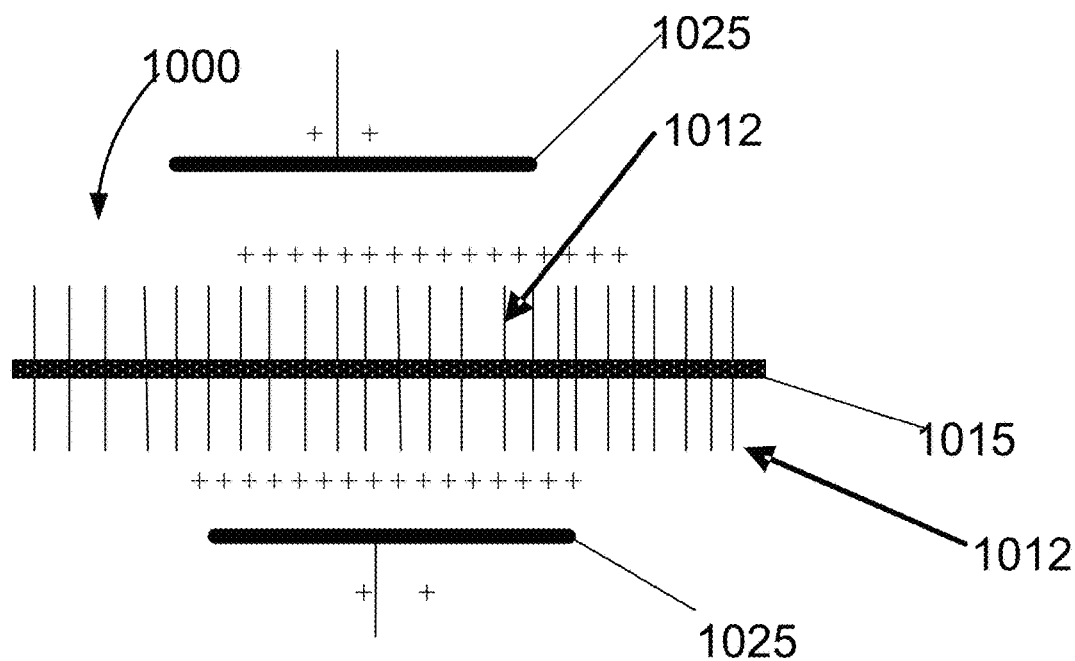
FIG. 10A is a schematic diagram of a piezoelectric FEAM layer using flocked piezoelectric fibers undergoing corona discharge poling in accordance with example embodiments disclosed herein.

Now referring to FIG. 10A, a piezoelectric FEAM layer 1000 includes piezoelectric fibers 1012 and a conductive fabric/film substrate 1015. After flocking the piezoelectric fibers 1012 onto the conductive fabric/film substrate 1015, the FEAM layer 1000 undergoes corona discharge poling or other poling methods. The poling process renders the FEAM layer 1000 piezoelectric. It is understood that different polarities and different methods of poling the fibers can be used. In one embodiment, the piezoelectric fibers 1012 are, for example, polyvinylidene fluoride (PVDF), poly (vinylidenefluoride-trifluoroethylene) copolymer (P(VDF-TrFE)) or lead zirconium titanate (PZT) fibers. The FEAM layers are poled in place (using corona discharge poling or other methods) to render the FEAM layers and therefore the composite panel piezoelectric.

Figure 10B:
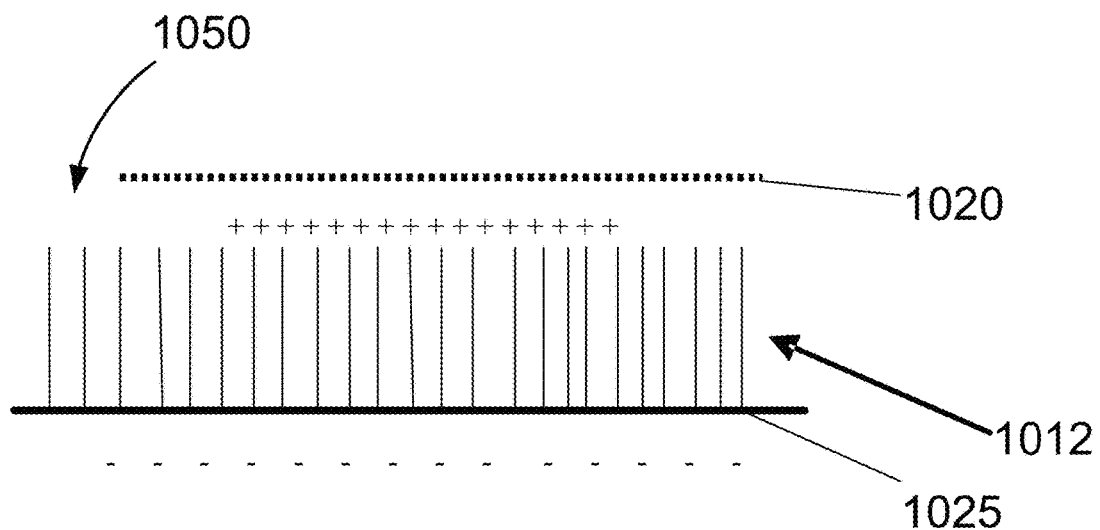
FIG. 10B is a schematic diagram of a piezoelectric FEAM layer using piezoelectric flock fibers in accordance with example embodiments disclosed herein.

Now referring to FIG. 10B, a FEAM layer 1050 include piezoelectric fibers 1012 which have been poled in a process similar to the process described above in conjunction with FIG. 10A. Here the substrate 1025 (e.g., a central support ply) of the FEAM layer is chosen to be a material that is electrically conducting to facilitate measurement of the piezoelectric signals resulting from the deformation of a FEAS panel upon impact.

Another flexible and electrically conductive component 1020 (also referred to as electrode 1020) serves as an electrode to measure the piezoelectric signal. Electrode 1020 can act as a divider or be used in conjunction with a divider. The piezoelectric FEAM (FEAS) layer can be double-side or single side.

In operation electrode 1020 is connected to a one pole (e.g., positive or negative) of an electrical circuit (not shown) used to measure the piezoelectric signal generated on an impact deformation and the electrically conductive substrate 1025 is connected to a pole with the opposite polarity. Here, electrode 1020 is the positive side of the circuit and the electrically conductive substrate 1025 is the negative side of the circuit. Electrode 1020 is part of the circuit to detect the piezoelectric pulses that would be generated by the mechanical deformation of the FEAM layer 1050. The signals processed in by the detection circuit are read and interpreted by additional instrumentation (e.g., electronic signal measurement devices and/or signal transmitting devices located either externally or internally to the composite panel). In these embodiments, the FEAM layer 1050 becomes the electro-active element sensor. These electro-active FEAM layers also have some degree of energy absorption.

One embodiment combines FEAM fibrous energy absorbing layers with the piezoelectric sensing technology in the form of piezoelectric FEAM layers or dividers to provide an integrated energy absorption and impact intensity monitoring system. This integrated system can be included as standard equipment in contact sport helmets (and apparel body pads and the like). These electro-active FEAM embodiments would enable detection of injury using a very light weight, detecting and impact event recording system. The impact event recording system would include the steps of detecting, recording and storing helmet impact intensity and number of events over the course of a player's game activity.

This information can be wirelessly transmitted to the medical staff on the sidelines for evaluation/assessment throughout the game. If the Impact "Hit" intensity goes over a certain "threshold," the player would be physically examined and if needed would be removed from the game. Finally, the head impact "History" of a Player would be kept on file. It could be used to assess the player's potential accumulated repetitive traumatic brain injury (TBI) condition and events as interpreted by medical guidelines to determine if the player can continue to play in a game.

Figure 11A:
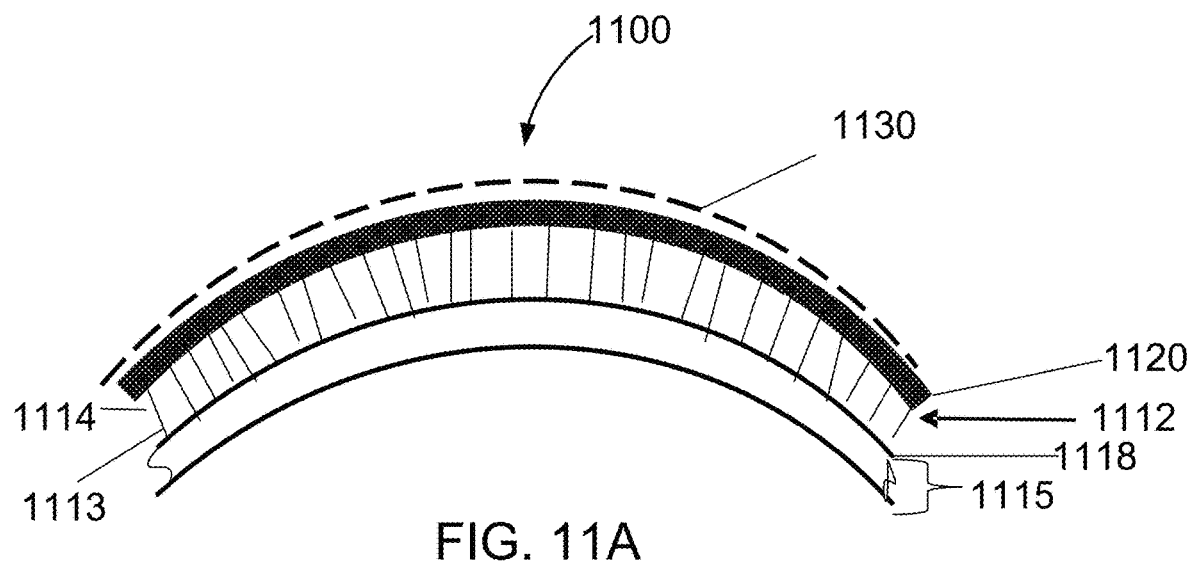
FIGS. 11A and 11B are schematic diagrams of composite panels applied to hard tough plastic helmet shell in accordance with example embodiments disclosed herein.

Now referring to FIG. 11A, an integrally flocked, impact absorbing outside covering system for a sport helmet 1100 includes a concentrically sized supplemental laminar composite helmet shell 1115 having an outer surface 1118, a plurality of flock fibers 1112 having first ends 1113 disposed on the outer surface 1118 of the helmet shell 1115 and second ends 1114, a flexible sheet 1120 that is impregnated with an abrasion resistant coating at least partially covering the second ends 1114 and a low friction surface coating 1130 disposed over the abrasion resistant coating on the flexible sheet 1120.

In other embodiments, double side FEAM layers can be used. During construction of one embodiment, flock fibers are applied directly to surface of helmet shell 1115.

Figure 11B:
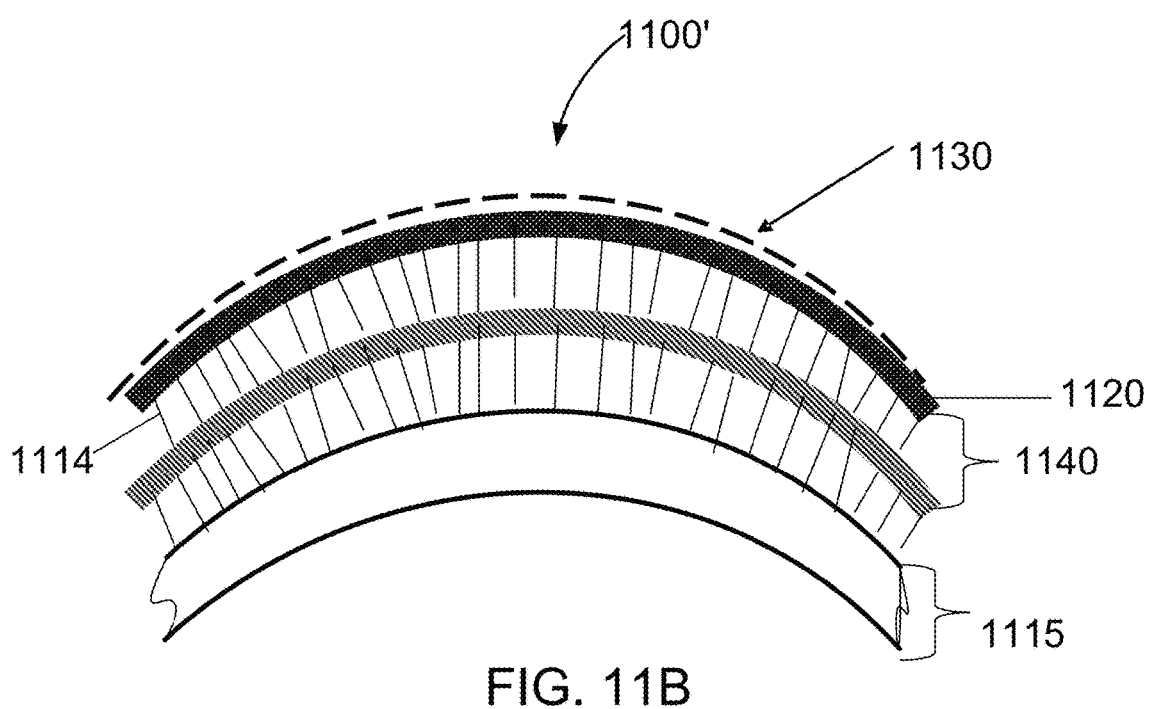

Now referring to FIG. 11B, an integrally flocked, impact absorbing outside covering system 1100' for a sport helmet similar to system 1000 includes an additional FEAM outer layer 1140. Here, second ends 1114 are disposed next to the flexible sheet 1120 that is impregnated at the tips of the flock fibers with an abrasion resistant coating at least. Applying the abrasion coating or layer to the tips of the FEAM layer flocked surface allows the flock layers to retain their energy absorbing spring action. In these embodiments, the FEAM layers show impact blunting properties in the context of the smooth "spring action" of compressing perpendicularly oriented, semi-stiff short textile fibers. These configurations facilitate the use of fibrous energy absorbing materials for sport helmet pad and protective apparel. Here, the low strain rate compression stress/strain behavior of FEAM layers is found to be a smooth continuous stress-strain pattern. This smooth deformation behavior is completely unlike a FOAM's or Spacer Fabric's compression deformation behavior. These materials always exhibit an initial low strain level "stress hump" which is characteristic of their viscoelastic nature or fibrous structure. A FEAM's compression behavior is based solely on a FEAM's unique energy absorbing mechanism; the spring action of short (nominally) perpendicularly oriented short fibers during a compression loading. As a final indication of the merits of FEAM materials compares the compression stress-strain behavior of a typical FEAM/FOAM layered assembly. The added FEAM element is capable of reducing the initial low strain level stress-hump region of the compression load-deflection curve. It is understood that various configurations and components (e.g., single side FEAM layers, double side FEAM layers, different dividers and covering fabrics can be used to optimize the high impact blunting capabilities of the covering systems.

While this smooth impact blunting feature applies to inside the sport helmet padding, this Flock Cushioning Effect should also apply if the perpendicularly oriented flock fibers are fixed to the outside of the sport helmet. If an outside of the helmet coating of flocked fiber were present, in an especially helmet-to-helmet collision of two similarly coated helmets, the resulting mechanical impact will be highly blunted by the Energy Absorbing action of the flocked outside-the-helmet layers.

Certain embodiments disclosed herein apply suitably stiffer and longer long flock fibers to the all or part of the outer surface of a sports helmet such as a football helmet. This flocked layer will then be surfaced by a thin layer of fabric, such as stretchable fabrics made of elastomeric yarns (e.g., Spandex). This stretchable fabric layer is then coated with a tough flexible polymeric coating leaving the helmet with a tough resilient, impact energy absorbing composite "skin" layer. The helmet's composite "skin" layer is then surfaced with a fluorocarbon material layer to greatly reduce the friction of the helmet's total surface. In yet another embodiment the flocked upon outside of the helmet surface is covered with a tough shrink-wrap type plastic film. In one embodiment, friction reducing surface treatments are applied to the covering (e.g., shrink-wrap film) which covers the flock fibers.

In this embodiment, the flock fibers are stiff enough and long enough to accommodate a reasonably good deformation strain during compressive impact. To accomplish this in one embodiment, the flock fibers are in the range of 20 to 60 denier polyester or nylon fibers and from about 1.52 mm (0.060") to about 5.08 mm (0.200") long. In a further embodiment, an energy absorbing polymer (fluid or gel) is added get to the Flocked (internal) volumetric section of this covering system. Energy absorbing polymeric gels (like polyethylene glycol fluid, silicone gels and the like) will greatly enhance the impact energy absorbing capabilities of this novel outside the football helmet impact energy absorbing system. The use of fluid to further enhance the impact energy absorbing performance of any or all FEAM materials is also possible. In other embodiments, the flocked fibers do not cover the entire surface of a helmet but are applied as patches on the helmet.

It is understood that in some embodiments only portions of a football helmet or other protective device need to be flock coated to provide the energy absorbing benefits. In some embodiments, only small sections of a football helmet are needed for impact "hit" protection. In these embodiments, shaped flocked strips of FEAM-Like elements are used as an additive coating. Bonding of these strips as "add-ons" employs a durable hot melt or otherwise a strong pressure sensitive adhesive system so that abrasion and peeling off of these FEAM elements strips from the helmet's surface are minimized. These shaped individual FEAM strips or patches could be used as add-on (the outside of the helmet) adaptable contact hit-blunting patches. These impact blunting patches would be positioned on the outside of the helmet at the discretion of the team's equipment manager, team physician, coach or the players themselves.

In one embodiment, the outside FEAM structure includes a stress hardening fluid which enhances impact energy reduction capacity. In another embodiment using a layered construction, the outside of a sport (football) helmet is flocked with fibers of the appropriate geometry and material, for example: 1 to 6 mm long, 20 to 60 denier, Nylon or Polyester. This flocked surface is then be covered by fabric or film membrane material so the outward ends of the surface/ends of this fibrous flocked array are locked in place. In this embodiment, a spandex like stretchable knitted cap fabric would serve to do this. With this overall covering of the flock fiber ends, the flock fibers would then be able to more broadly and evenly (area-wise) participate in distributing the impact strike's force against the helmet. Next, this "membrane" covered flocked helmet is coated with a tough, durable resilient coating that will serve to seal the membrane cover fabric so that it is protected from the elements. This overall coating is also designed to a have a low coefficient of friction so as to reduce the contact friction of the flocked helmet during helmet-to-helmet contact sports action. In some embodiments, the overall thickness of this "cover/coating" encapsulated flock fiber energy absorbing helmet outer layer system should be between about 1.5 mm to about 9.5 mm thick. In another embodiment, the open space between the flock fibers in this layered construction is filled with an energy absorbing gel/fluid material. This thin "impact absorbing gel" (e.g., silicone) layer would be sealed into the flocked coating system. This would give the flocked energy absorbing system an extra added energy absorbing capability. Coupling this invented outside-the-helmet impact energy absorbing covering system the existing energy absorbing inside-the-helmet pad material provides the maximum impact/strike protection for the helmet wearer.

Figure 12:
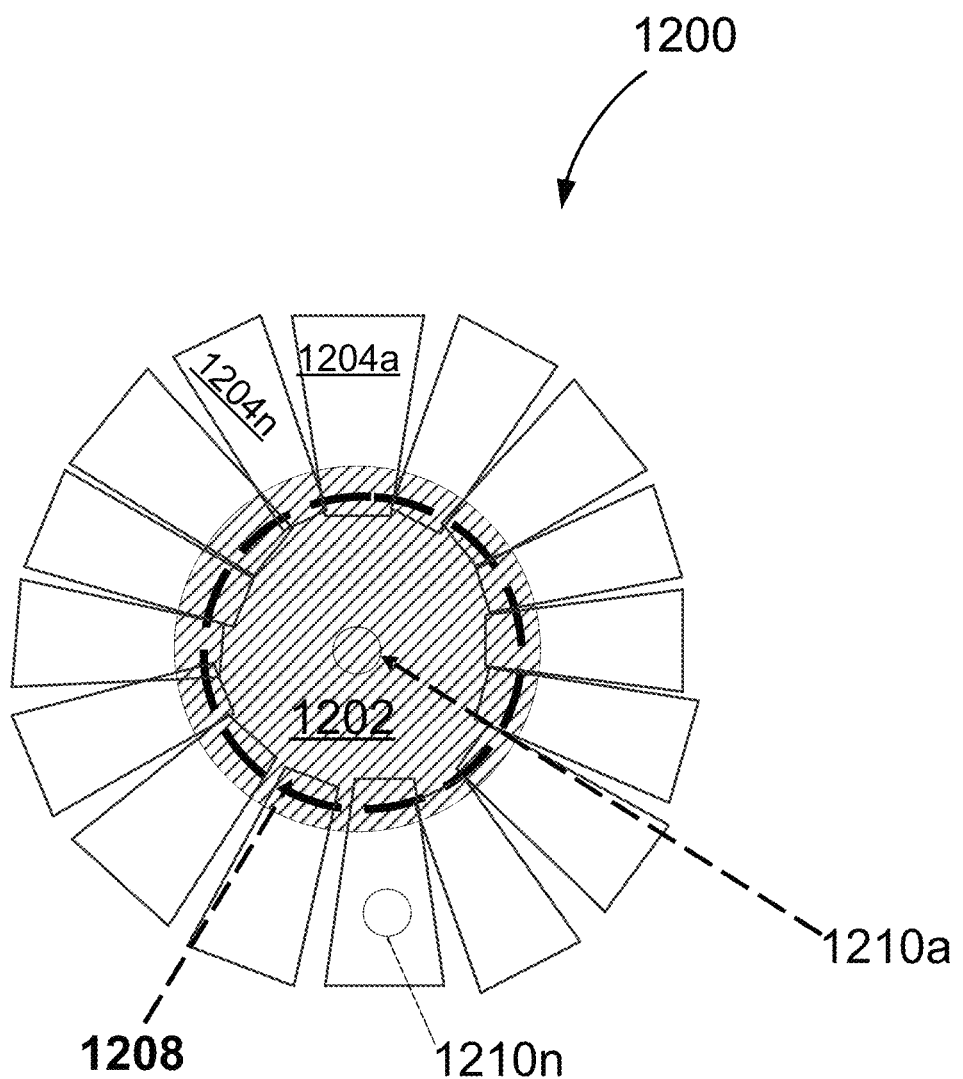
FIG. 12 is a schematic diagram of a flocked helmet cover pad (FHCP) attachable to a helmet cover in accordance with embodiments disclosed herein.

Now referring to FIG. 12, an exemplary flocked helmet cover pad (FHCP) 1200 attachable to a helmet cover (not shown) includes a central hub pad 1202 (also referred to as central hub 1202) fabricated from a first multi-layer FEAM pad (described below in FIG. 13) and multiple appendages 1204a-1204n (collectively referred to as appendages 1204 and individually appendage 1204), each appendage 1204 is fabricated from a second multi-layer FEAM pad (described below in FIG. 13) and attached to the central hub 1202. In various embodiments, the appendages 1204 are attached to the central hub 1202 by sealing or sewing around a perimeter 1208 of the central hub 1202. Sealing includes, but is not limited to, using a hot melt adhesive, ultrasonic bonding or other binding techniques know in the art. Each appendage 1204 is shaped and arranged to provide additional impact energy absorption properties for a helmet. Each appendage 1204 can be designed to accommodate different impact energy absorption properties at various locations in the FHCP 1200.

The FHCP 1200 can optionally include one or more attachment points 1210a-1210n (also referred to as fastener 1210) for attachment to a helmet shell. In one embodiment the attachment points 1210 comprise hook and loop fasteners. In impact testing the FHCP 1200 it was unexpectedly found that when only one attachment point 1210a was used that the impact testing results were better than when multiple attachment points were used (e.g., six attachment points). One hypothesis is that perhaps with a single attachment point some "unwanted" movement served as an additional energy absorbing mechanism. Apparently, there was frictional sliding of the FHCP 1200 assembly across the ACH's rough 'granular' surface during impact. This movement provides a strong enough effect so as to lower these measured "G" force value during impact testing. It appears that the sliding/skidding/frictional contact between the IEA pad and the helmet surface adds another mode of energy absorption to the pad system. The sliding friction effect coupled with the pad's normal compressional IEA mode give the pad system added IEA capability. In one embodiment, the FHCP 1200 is sized to be used inside the helmet without a helmet cover.

In one embodiment the central hub pad 1202 has an approximately five inch diameter. In another embodiment the central hub 1202 and appendages 1204 cover up to 90 percent of an outer surface of the helmet. In another embodiment shown in FIG. 14 modified appendages 1204' have slits 1205.

In another embodiment, each of appendages 1204 has an approximate trapezoidal shape. These appendages 1204 can be equally spaced approximately trapezoidal shaped multi-layer FEAM pads. In one embodiment, the trapezoidal appendages are approximately two inches wide at the hub attachment end by five inches long and three inches wide at an outer end. In one embodiment, the FHCP 1200 is adjustable on the outside of the helmet. In one embodiment, the FHCP is first attached to the interior of a Velcro® hood strip modified fabric helmet cover to secure it. The helmet cover including the FHCP 1200 insert is then ready to be adjustably attached to a hard shell military or sport helmet by the placement of fasteners on the helmet and corresponding locations on the FHCP 1200.

A technique for making the flocked helmet cover pad (FHCP) 1200 attachable to a helmet cover includes assembling a central hub 1202 comprising a multi-layer FEAM pad, assembling a plurality of appendages 1204 comprising multi-layer FEAM pads; and attaching the plurality of appendages to the central hub which in one embodiment has an extended perimeter fabric zone to facilitate appendage sewing to the central hub. One side of the multi-layer FEAM pad includes a Velcro® "loop" fabric so it can fasten Velcro® "hook" strips that have been attached to the interior of the fabric helmet cover. The excess edge fabric can be trimmed off in final assembly.

Figure 13:
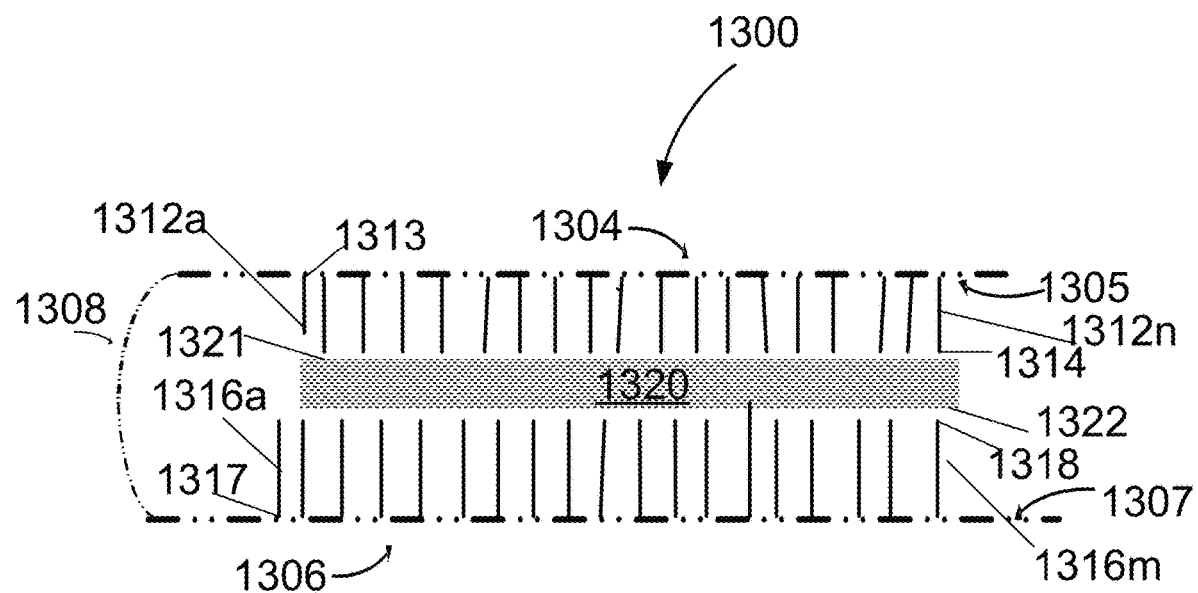
FIG. 13 is a schematic diagram of a multi-layer FEAM pad of the FHCP of FIG. 12.

Now referring to FIG. 13, an exemplary multi-layer FEAM pad 1300 (also referred to as a FEAM pad 1300) includes a first outer wrapping fabric 1304 having a first surface 1305, a first multiplicity of monofilament fibers 1312a-1312n (collectively 1312), each having a first end 1313 and a second end 1314, each of the first multiplicity of monofilament fibers 1312 at their first ends 1313 flocked (e.g., adhesively bonded) onto the first surface 1305 of the first outer wrapping fabric 1304 with the second ends 1314 of the first multiplicity of monofilament fibers 1312 extending away from the first surface 1305 of the of the first outer wrapping fabric 1304. The FEAM pad further includes a center core 1320 having a first surface 1321 disposed adjacent the second ends 1314 of the first multiplicity of monofilament fibers 1312 and a second multiplicity of monofilament fibers 1316a-1316n (collectively monofilament fibers 1316 or fiber 1316), each fiber 1316 having a first end 1317 and a second end 1318, the second multiplicity of monofilament fibers 1316 at their first ends 1317 flocked onto a first surface 1307 of a second outer wrapping fabric 1306 with the second ends 1318 of the second multiplicity of monofilament fibers 1316 extending away from the first surface 1307 of the of the second outer wrapping fabric 1306 and disposed adjacent to a second surface 1322 of the center core 1320.

In one embodiment, the first outer wrapping fabric 1304 includes but is not limited to a micro-suede fabric or a hook and loop, loop fabric (e.g., GT-1758 Velcro® loop).

The second outer wrapping fabric 1306 can be identical to or different from the first outer wrapping fabric 1304. The first outer wrapping fabric 1304 can be joined to the second outer wrapping fabric 1306 at a perimeter of the first multi-layer FEAM by sewing, adhesively bonding, ultrasonic bonding or other techniques known in the art.

In one embodiment, the second ends of the first multiplicity of monofilament fibers and the second ends of the second multiplicity of monofilament fibers remain loose from the center core. In one embodiment, the center core 1320 comprises a foam core. In one embodiment is the first multiplicity of monofilament fibers 1312 each has a fineness in a range of about 40 denier to about 100 denier and a length between about 2 mm to about 4 mm. The second multiplicity of monofilament fibers can be identical to or different from the first multiplicity of monofilament fibers.

In one embodiment, the Foam Core Pads are covered with FEAM-VelTex® Fabric to complete the appendage configurations. The completed unitary assembly will be Velcro® Fixed to the inside of an ACH Helmet Cover.

Figure 14:
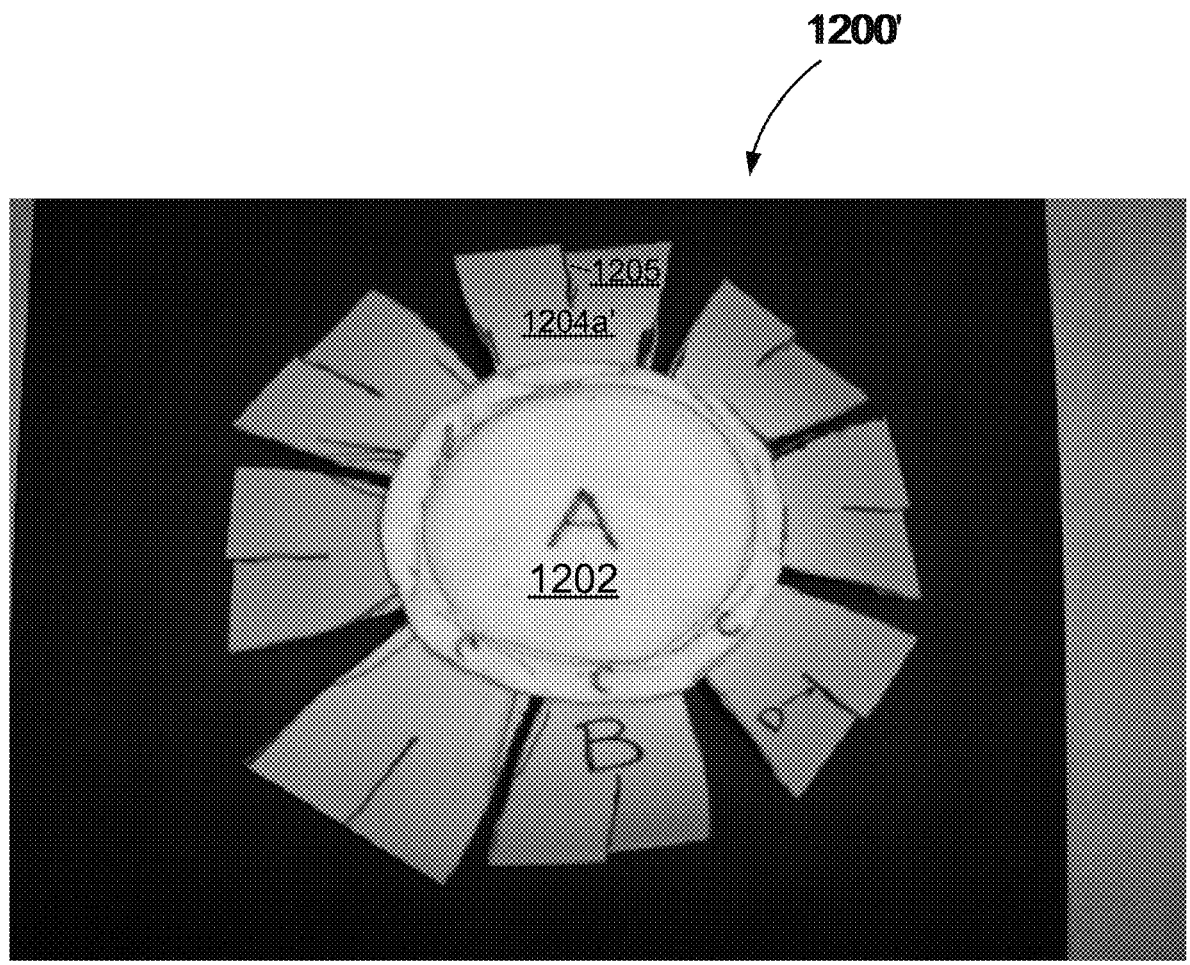
FIG. 14 is a schematic diagram of an alternate embodiment of FIG. 12 with slits in the appendages.

Now referring to FIG. 14, a modified FHCP 1200' includes modified appendages 1204' which include slits 1205. The slits 1205 are made in the assembled foam core appendages 1204' to provide facile bending and conformance to the hemi-spherical shape of the helmet onto which this assembly will be fitted.

Figure 15:
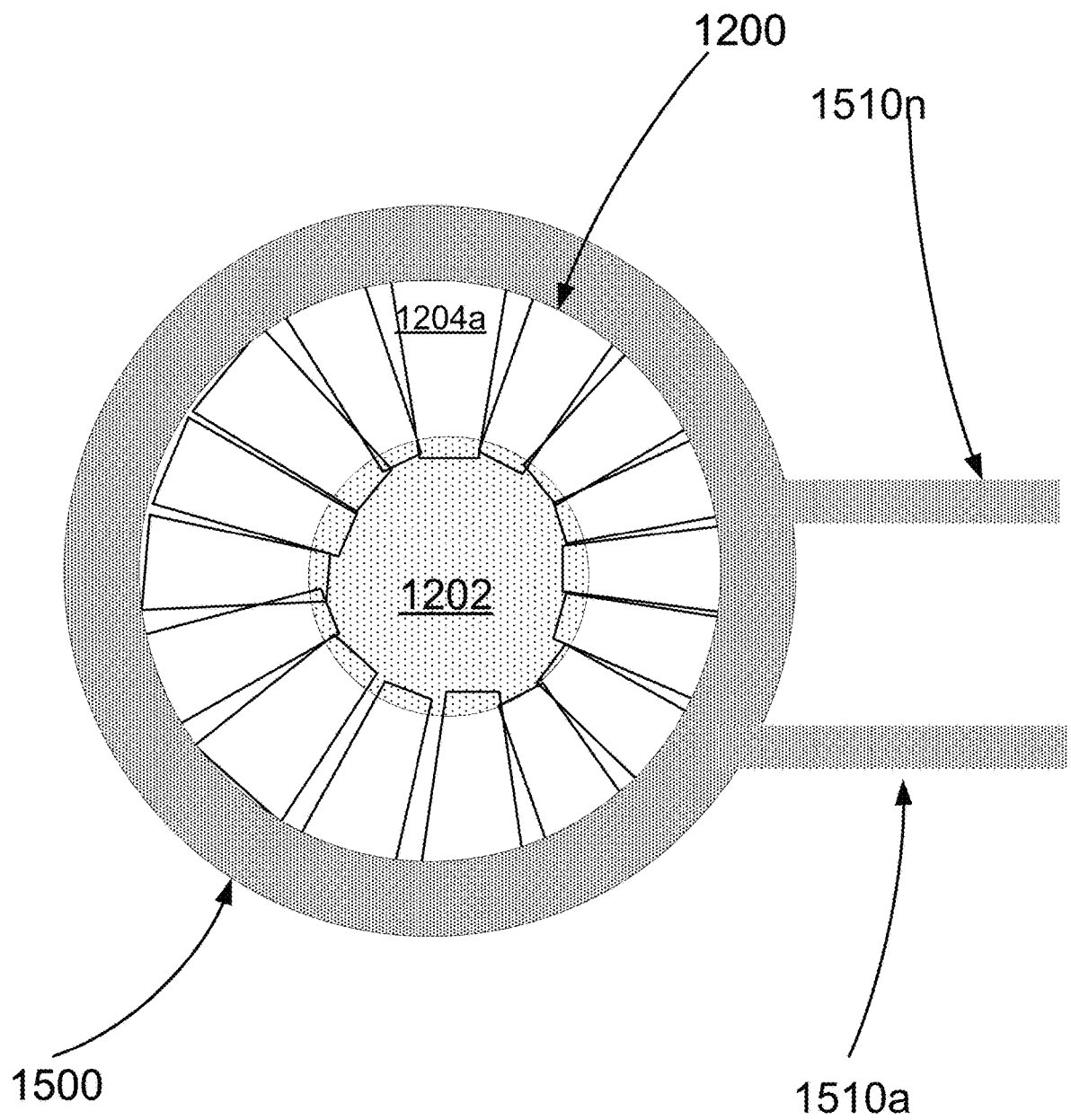
FIG. 15 show the FHCP of FIG. 12 inserted into a helmet cover.

FIG. 15 shows the FHCP 1200 inserted into a helmet cover 1500. The helmet cover 1500 includes straps 1510a-1510n to provide an adjustable fit of the on top of a helmet.

Figure 16:
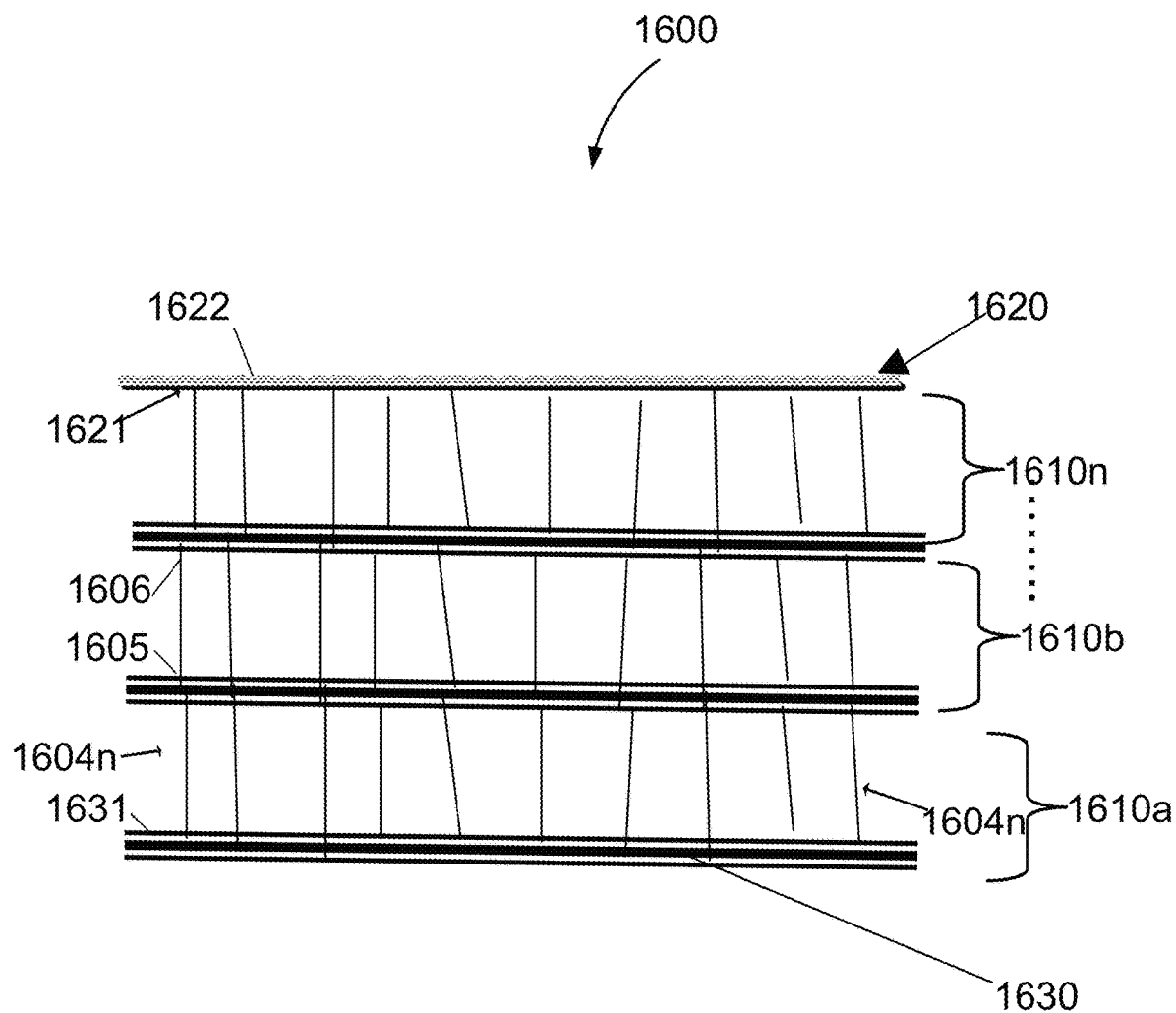
FIG. 16 is a schematic diagram of an alternate multi-layer FEAM pad for a shell in accordance with one example embodiment disclosed herein.

Now referring to FIG. 16 an alternative multi-layer FEAM pad 1600 includes an outer wrapping fabric 1620 having an inner first surface 1621, a plurality of layers 1610a-1610n (collectively layer 1610) in a stacked configuration covered by the inner first surface 1621 of the outer wrapping fabric 1620, each layer 1610 includes a multiplicity of monofilament fibers 1604a-1604n, each having a first end 1605 and a second end 1606, each of the multiplicity of monofilament fibers 1604 at their first ends 1605 being flocked (e.g., adhesively bonded) onto a first surface 1631 of a substrate 1630 with the second ends 1606 of the multiplicity of monofilament fibers 1604 extending away from the first surface 1631 of the substrate 1630 and the outer wrapping fabric comprises a hard outer surface layer 1622. In one embodiment the second ends 1606 of the flock fibers 1604 are loose and unattached from the outer wrapping fabric 1620 and the substrate 1630. In another embodiment, the hard outer surface layer is impregnated and cured with an epoxy based resin.

In one embodiment, a FEAM helmet shell (FHS) is similar to a FHCP 1200 but includes a modified a hard outer surface layer 1622 and is epoxy based. In one embodiment, the hard outer surface layer 1622 is fabricated using Z-axis Organic Polymer Laminar Composite (OPLC) technology. Using this Z-axis technology, some light weight, Kevlar®/epoxy, blast resistant layered composite 'hard" layers form the hard outer surface layer 1622. The hard outer surface layer 1622 is designed to blunt incoming helmet strikes. In one embodiment the substrate 1630 is fabricated from a stretchable, knitted PET (e.g., WUJI Charcoal JET SET 100% PET knit fabric made in USA-JoAnn Fabric #194932601). The FHS embodiment includes concentrically fitted, hard, FEAM containing laminar composite (blast resistant) shell that can be fitted over an existing hard shell military or sport helmet. This blast resistant hard shell add-on is held onto the primary worn helmet by adding a fabric helmet cover to the helmet. The FHS is secured to the worn helmet the same way as the FCHP insert using hook and loop fasteners (e.g., Velcro®).

From the foregoing it will be appreciated that the invention provides a new type of energy absorbing padding material described as panels and panel configurations and constructions adapted to cushion or blunt mechanical impact loads. Depending on the application, panels in accordance with the invention may be used by themselves as a primary protective element or in conjunction with other energy absorbing devices and energy absorbing layer materials. The composite panels may be used individually or in combination with other energy absorbing layered materials to achieve the desired energy absorption properties. The panels may be of lightweight, non-bulky construction suitable for use in protective garments or sports equipment. The panels are lightweight and are easily manufactured at low cost. In addition to the impact absorbing features of the invention, the panels can breathe and thereby enhance user comfort. The principles of the invention may be incorporated in various combinations of support ply configurations. The energy absorbing fibers serve as tiny spring like spacer elements. In order to enhance the frictional characteristics of the fibers they may be treated with a friction-enhancing sizing. Embodiments may include a single or multilayer sandwich configuration with the fibers ends separated with a divider (e.g., fabric, sheet, foam, spacer fabric or film) and covering the assembly of elements of the sandwich with a soft and smooth outer surfaced covering fabric.

It should be understood, however, that the foregoing description of the invention is intended to be merely illustrative thereof and that other embodiments, modifications and equivalents may be apparent to those skilled in the art without departing from the principles of the invention.

The invention claimed is:

1. A flocked helmet cover pad (FHCP) attachable to a helmet cover comprising:
   a central hub comprising a first multi-layer Flocked Energy Absorbing Material (FEAM) pad;
   a plurality of appendages, each appendage comprising a second multi-layer FEAM pad and attached to the central hub;
   wherein each appendage is shaped and arranged to provide additional impact energy absorption properties to a helmet;
   wherein the first multi-layer FEAM pad comprises
   a first outer wrapping fabric having a first surface;
   a first multiplicity of monofilament fibers, each having a first end and a second end, each of the first multiplicity of monofilament fibers at their first ends being attached by flocking onto the first surface of the first outer wrapping fabric with the second ends of the first multiplicity of monofilament fibers extending away from the first surface of the first wrapping fabric;
   a center core having a first surface disposed adjacent the second ends of the first multiplicity of monofilament fibers; wherein the center core comprises an unflocked foam layer;

a second multiplicity of monofilament fibers, each having a first end and a second end, the second multiplicity of monofilament fibers at their first ends being flocked onto a first surface of a second outer wrapping fabric with the second ends of the second multiplicity of monofilament fibers extending away from the first surface of a second outer wrapping fabric and disposed adjacent to a second surface of the center core; and wherein the second ends of the first multiplicity of monofilament fibers and the second ends of the second multiplicity of monofilament fibers remain loose from the center core.

2. The FHCP of claim 1, wherein the first multi-layer FEAM pad comprises a fastener attachable to the helmet cover.

3. The FHCP of claim 1, wherein the central hub and plurality of appendages cover up to 90 percent of an outer surface of the helmet.

4. The FHCP of claim 1, wherein at least one of the plurality of appendages has a slit.

5. The FHCP of claim 1, wherein each of the plurality of appendages comprise an equally spaced approximately trapezoidal shaped multi-layer FEAM pad.

6. The FHCP of claim 1, wherein the a first outer wrapping fabric comprises one of:
a micro-suede fabric; and
a loop fabric.

7. The FHCP of claim 1, wherein the first outer wrapping fabric is joined to the second outer wrapping fabric at a perimeter of the first multi-layer FEAM pad by one of:
sewing;
ultrasonic bonding; and
adhesively bonding.

8. The FHCP of claim 1, wherein the first multiplicity of monofilament fibers each have a fineness in a range of about 40 denier to about 100 denier and a length between about 2 mm to about 4 mm.

9. The FHCP of claim 1, wherein the FHCP is adjustable on an outside surface of the helmet.

10. The FHCP of claim 1, wherein the FHCP is sized to be used inside the helmet.

11. The FHCP of claim 1,
wherein the first outer wrapping fabric comprises a hard outer surface layer.

12. The FHCP of claim 11 wherein the first outer wrapping is impregnated and cured with an epoxy based resin to form the hard outer surface layer.

13. The FHCP of claim 1, further comprising a single hook and loop attachment point to the helmet cover, the attachment point comprising one of a hook component and a loop component.

* * * * *